(12) United States Patent
Burns

(10) Patent No.: US 10,807,813 B2
(45) Date of Patent: Oct. 20, 2020

(54) DEBRIS CARTS AND SYSTEMS AND METHODS OF USING SAME

(71) Applicant: RICHARD S. BURNS & COMPANY, INC., Philadelphia, PA (US)

(72) Inventor: Allen T. Burns, Philadelphia, PA (US)

(73) Assignee: RICHARD S. BURNS & COMPANY, INC., Philadelphia, PA (US)

( * ) Notice: Subject to any disclaimer, the term of this patent is extended or adjusted under 35 U.S.C. 154(b) by 343 days.

(21) Appl. No.: 15/487,149

(22) Filed: Apr. 13, 2017

(65) Prior Publication Data

US 2017/0297837 A1      Oct. 19, 2017

Related U.S. Application Data

(63) Continuation-in-part of application No. 15/099,345, filed on Apr. 14, 2016.

(51) Int. Cl.
*B65G 67/48* (2006.01)
*B62B 3/00* (2006.01)
*B62B 3/16* (2006.01)
*B65G 67/46* (2006.01)

(52) U.S. Cl.
CPC ............ *B65G 67/48* (2013.01); *B62B 3/005* (2013.01); *B62B 3/16* (2013.01); *B65G 67/46* (2013.01)

(58) Field of Classification Search
CPC .... B65G 67/46; B65G 69/0458; B65G 67/48; B62B 3/005
USPC ....................................................... 414/418
See application file for complete search history.

(56) References Cited

U.S. PATENT DOCUMENTS

| D202,493 | S | 10/1965 | Gribbens |
| 3,366,397 | A | 1/1968 | Zeilstra et al. |
| 3,788,702 | A | 1/1974 | Toboll |
| 3,797,878 | A * | 3/1974 | Fagre ............ B65D 90/623 294/68.21 |
| 3,858,939 | A | 1/1975 | Bond et al. |
| 3,888,351 | A | 6/1975 | Wilson |
| D240,614 | S | 7/1976 | Paterno |

(Continued)

FOREIGN PATENT DOCUMENTS

| CA | 2964227 | 4/2017 |
| CA | 2964227 A1 | 10/2017 |

(Continued)

OTHER PUBLICATIONS

Restriction Requirement dated Jul. 24, 2017 by the U.S. Patent and Trademark Office for U.S. Appl. No. 29/561,274, filed Apr. 14, 2016 (Inventor—Burns et al.; Applicant—Richard S. burns & Company, Inc.) (6 pages).

(Continued)

*Primary Examiner* — Saul Rodriguez
*Assistant Examiner* — Willie Berry, Jr.
(74) *Attorney, Agent, or Firm* — Ballard Spahr LLP

(57) ABSTRACT

Systems and methods for processing debris from job sites are disclosed. Carts for receiving the debris are also disclosed. Each cart has a base, a plurality of wheels extending downwardly from the base relative to a vertical axis, and a plurality of walls extending upwardly from the base. The walls and the base of each cart cooperate to define a debris-receiving space. The carts can be engaged by a lifting apparatus that rotates along an arcuate path to position the carts in an unloading position.

26 Claims, 14 Drawing Sheets

(56) References Cited

U.S. PATENT DOCUMENTS

| | | | |
|---|---|---|---|
| 4,054,301 A | 10/1977 | Bond et al. | |
| 4,129,314 A | 12/1978 | Bond et al. | |
| 4,162,086 A | 7/1979 | Bond et al. | |
| 4,723,887 A | 2/1988 | Swain | |
| D301,651 S | 6/1989 | Rinkewich | |
| 4,872,801 A | 10/1989 | Yeazel et al. | |
| 5,000,641 A * | 3/1991 | Kikuchi | B65F 1/0093 414/21 |
| D326,171 S | 5/1992 | Brenner et al. | |
| D326,198 S | 5/1992 | Pacetti et al. | |
| 5,213,367 A | 5/1993 | Norman, Jr. et al. | |
| 5,297,911 A | 3/1994 | Powell | |
| D362,102 S | 9/1995 | Campbell et al. | |
| D375,470 S | 11/1996 | Adams | |
| 5,618,155 A | 4/1997 | Tighe | |
| D411,044 S | 6/1999 | Maddux et al. | |
| 6,447,235 B1 | 9/2002 | Galeazzi et al. | |
| D527,856 S | 9/2006 | Tropepe | |
| 7,232,136 B2 | 6/2007 | Sheehan | |
| D577,171 S | 9/2008 | Moore | |
| D620,220 S | 7/2010 | Hsu | |
| D637,114 S | 5/2011 | Ries | |
| 8,308,173 B2 | 11/2012 | Pazhoor | |
| D678,127 S | 3/2013 | Markham | |
| D711,613 S | 8/2014 | Brenner | |
| 8,833,580 B2 | 9/2014 | Rogers | |
| D743,190 S | 11/2015 | Franck et al. | |
| 9,347,821 B1 | 5/2016 | Mullaney | |
| D821,675 S | 6/2018 | Burns et al. | |
| D822,932 S | 7/2018 | Burns et al. | |
| 2003/0031543 A1 | 2/2003 | Elbrink | |
| 2005/0140104 A1 | 6/2005 | Pan et al. | |
| 2009/0315210 A1 * | 12/2009 | Linares | B29C 45/0084 264/219 |
| 2010/0012667 A1 | 1/2010 | Powell | |
| 2011/0068954 A1 | 3/2011 | McQuade et al. | |
| 2012/0242051 A1 | 9/2012 | LaCasse | |
| 2014/0271066 A1 | 9/2014 | Hou | |
| 2017/0297836 A1 | 10/2017 | Burns | |

FOREIGN PATENT DOCUMENTS

| | | |
|---|---|---|
| DE | 2510617 A1 | 9/1976 |
| DE | 19524554 A1 | 1/1996 |
| JP | 4416248 B2 | 2/2010 |

OTHER PUBLICATIONS

Response to Restriction Requirement dated Sep. 12, 2017 to the U.S. Patent and Trademark Office for U.S. Appl. No. 29/561,274, filed Apr. 14, 2016 (Inventor—Burns et al.; Applicant—Richard S. burns & Company, Inc.) (9 pages).

Non-Final Rejection dated Nov. 16, 2017 by the U.S. Patent and Trademark Office for U.S. Appl. No. 29/561,274, filed Apr. 14, 2016 (Inventor—Burns et al.; Applicant—Richard S. burns & Company, Inc.) (7 pages).

Response to Non-Final Office Action dated Feb. 1, 2018 with the U.S. Patent and Trademark Office for U.S. Appl. No. 29/561,274, filed Apr. 14, 2016 (Inventor—Burns et al.; Applicant—Richard S. burns & Company, Inc.) (9 pages).

Restriction Requirement dated Jul. 25, 2017 by the U.S. Patent and Trademark Office for U.S. Appl. No. 29/561,277, filed Apr. 14, 2016 (Inventor—Burns et al.; Applicant—Richard S. burns & Company, Inc.) (6 pages).

Response to Restriction Requirement dated Sep. 12, 2017 to the U.S. Patent and Trademark Office for U.S. Appl. No. 29/561,277, filed Apr. 14, 2016 (Inventor—Burns et al.; Applicant—Richard S. burns & Company, Inc.) (6 pages).

Non-Final Rejection dated Nov. 2, 2017 by the U.S. Patent and Trademark Office for U.S. Appl. No. 29/561,277, filed Apr. 14, 2016 (Inventor—Burns et al.; Applicant—Richard S. burns & Company, Inc.) (7 pages).

Response to Non-Final Office Action filed on Feb. 1, 2018 with the U.S. Patent and Trademark Office for U.S. Appl. No. 29/561,277, filed Apr. 14, 2016 (Inventor—Burns et al.; Applicant—Richard S. burns & Company, Inc.) (9 pages).

Restriction Requirement dated Jan. 8, 2018 by the U.S. Patent and Trademark Office for U.S. Appl. No. 15/099,345, filed Apr. 14, 2016 and published as US 2017/0297836 on Oct. 19, 2017 (Inventor—Allen T. Burns; Applicant—Richard S. Burns & Co., Inc.) (6 pages).

International Search Report and Written Opinion dated Jun. 28, 2018 by the International Searching Authority for International Application No. PCT/US2018/027328, filed on Apr. 12, 2018 (Applicant—Richard S. Burns and Company, Inc.) (19 Pages).

Notice of Allowance dated Mar. 7, 2018 to the U.S. Patent and Trademark Office for U.S. Appl. No. 29/561,274, filed Apr. 14, 2016 (Inventor—Burns et al.; Applicant—Richard S. burns & Company, Inc.) (5 pages).

Issue Notification dated Jun. 20, 2018 to the U.S. Patent and Trademark Office for U.S. Appl. No. 29/561,274, filed Apr. 14, 2016 (Inventor—Burns et al.; Applicant—Richard S. burns & Company, Inc.) (1 page).

Notice of Allowance filed on Mar. 5, 2018 with the U.S. Patent and Trademark Office for U.S. Appl. No. 29/561,277, filed Apr. 14, 2016 (Inventor—Burns et al.; Applicant—Richard S. burns & Company, Inc.) (5 pages).

Issue Notification filed on Jun. 6, 2018 with the U.S. Patent and Trademark Office for U.S. Appl. No. 29/561,277, filed Apr. 14, 2016 (Inventor—Burns et al.; Applicant—Richard S. burns & Company, Inc.) (1 page).

Response to Restriction Requirement dated Mar. 8, 2018 to the U.S. Patent and Trademark Office for U.S. Appl. No. 15/099,345, filed Apr. 14, 2016 and published as US 2017/0297836 on Oct. 19, 2017 (Inventor—Allen T. Burns; Applicant—Richard S. Burns & Co., Inc.) (8 pages).

Non Final Rejection dated Jul. 17, 2018 by the U.S. Patent and Trademark Office for U.S. Appl. No. 15/099,345, filed Apr. 14, 2016 and published as US 2017/0297836 on Oct. 19, 2017 (Inventor—Allen T. Burns; Applicant—Richard S. Burns & Co., Inc.) (9 pages).

Non Final Rejection dated Jul. 8, 2019 by the USPTO for U.S. Appl. No. 15/099,345, filed Apr. 14, 2016, and published as US 2017-0297836 A1, on Oct. 19, 2017 (Inventor—Allen T. Burns) (10 pages).

U.S. Appl. No. 29/561,274, filed Apr. 14, 2016, Allen T. Burns (Richard S. Burns & Co.,., Inc.)

U.S. Appl. No. 29/561,277, filed Apr. 14, 2016, Allen T. Burns (Richard S. Burns & Co., Inc.).

U.S. Appl. No. 15/099,345 (2017/0297836-A1), filed Apr. 14, 2016 (Oct. 19, 2017), Allen T. Burns (Richard S. Burns & Co., Inc.).

\* cited by examiner

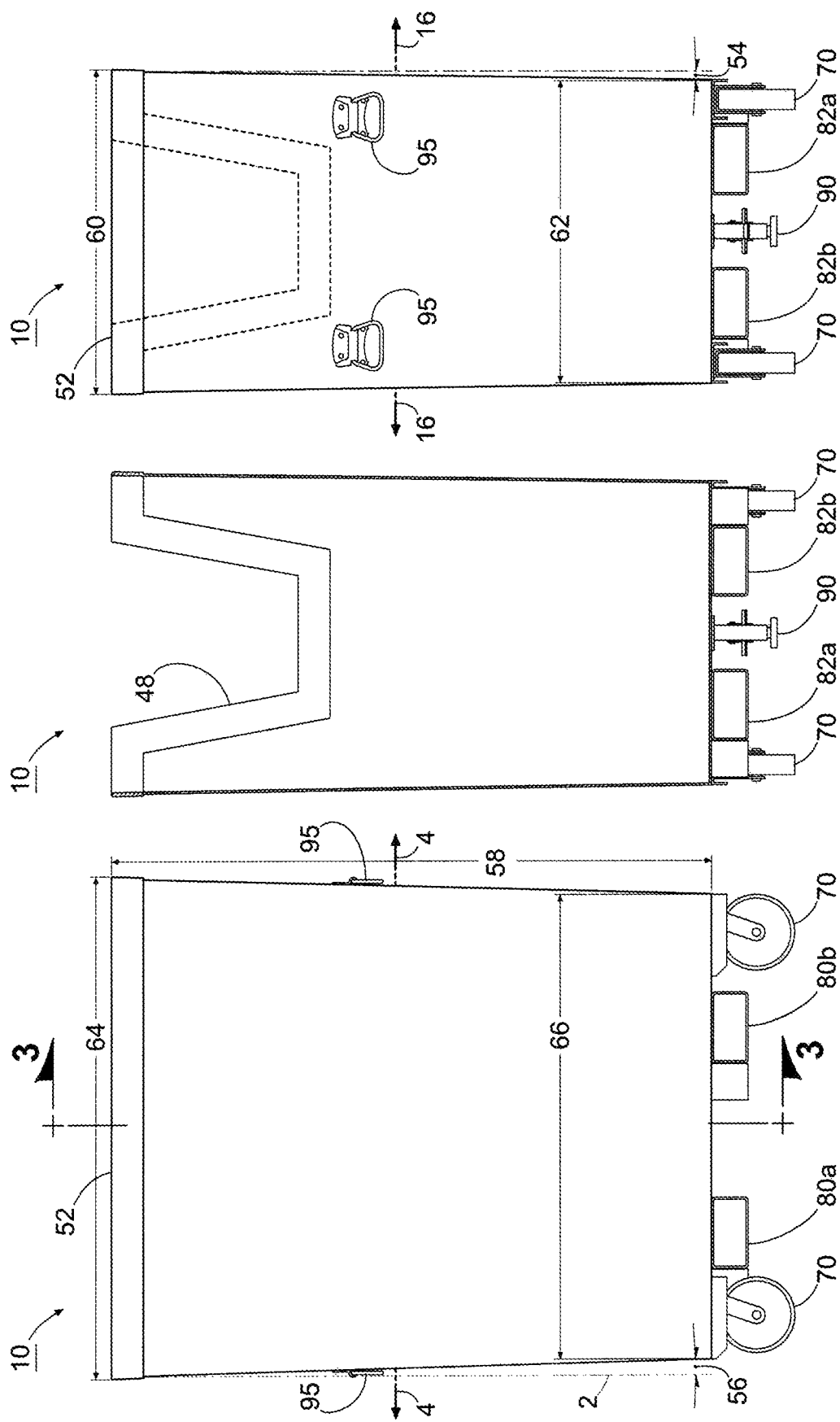

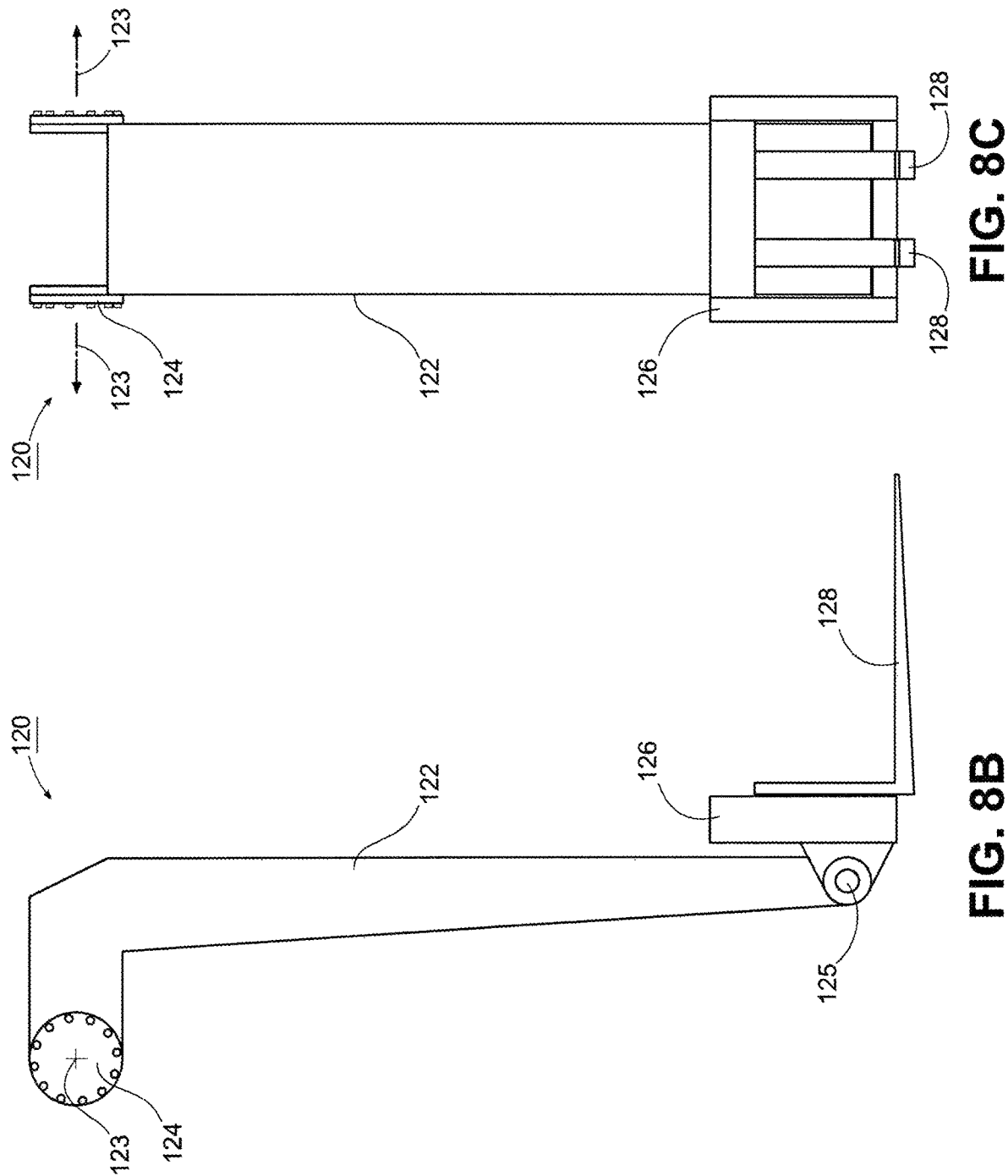

DEBRIS CARTS AND SYSTEMS AND METHODS OF USING SAME

CROSS-REFERENCE TO RELATED APPLICATION

This application is a continuation-in-part of U.S. patent application Ser. No. 15/099,345, filed on Apr. 14, 2016, which application is hereby incorporated by reference herein in its entirety.

FIELD

This invention relates to carts for receiving debris from a jobsite, as well as systems and methods for using such carts to process debris.

BACKGROUND

Conventional techniques for processing debris generated at a jobsite require that the debris be handled by a large number of workers. Typically, a large dumpster is delivered to a jobsite using a roll-off truck. A large designated area is required for placement, loading, and unloading of the dumpster. Thus, the dumpster typically remains in a fixed location, which is often inconveniently located a long distance from the location where debris is generated or obtained. Consequently, debris is often piled up on ground or floor surfaces to be transported to the dumpster at a later time. Usually, at least two separate handling operations (piling of debris, transport of debris) are required to position the debris in the dumpster. The dumpster typically receives all types of debris from a jobsite and remains open to permit positioning of material within the dumpster at any time. Not surprisingly, such dumpsters are often filled with a wide variety of debris types, making it difficult to separate recyclable materials from other materials. Additionally, because the dumpsters are easily accessible by members of the public, the dumpsters often are filled with non-jobsite waste.

Thus, there is a need for improved systems and methods for processing debris generated at a jobsite. In particular, there is a need for systems and methods that minimize the number of handling operations required to process debris generated at a jobsite. There is a further need for systems and methods that improve the efficiency, reliability, and/or security of debris processing.

SUMMARY

Described herein, in various aspects, is a system for processing debris. The system can have at least one cart, a lifting apparatus, and a first conveyor assembly (e.g., an upstream conveyor assembly). Each cart can have a base, a plurality of wheels extending downwardly from the base relative to a vertical axis, and a plurality of walls extending upwardly from the base. The walls and the base of each cart can cooperate to define a debris-receiving space. The lifting apparatus can have at least one arm assembly configured to engage a portion of the base of a respective cart of the at least one cart when the cart is in a resting position. Following engagement between the at least one arm assembly and the cart, the at least one arm assembly of the lifting apparatus can be selectively rotatable relative to a rotational axis to move the cart about and between the resting position and an unloading position. The cart can reach the unloading position following rotational movement of the at least one arm assembly of the lifting apparatus along an arcuate path having an arc length ranging from about 130 degrees to about 170 degrees. The first conveyor assembly can be configured to receive debris from the at least one cart when the at least one cart is in the unloading position.

The system can further comprise a plurality of bins capable of receiving debris. Each bin can have a base assembly having a base that can be configured for selective movement about and between an open position and a closed position, and an actuator that can be operatively coupled to the base and operable to effect selective movement of the base about and between the open position and the closed position. Each bin of the plurality of bins can have a plurality of walls coupled to and extending upwardly from the base. The plurality of walls and the base can cooperate to define an interior space. The system can further include a downstream conveyor assembly configured to deliver debris toward the plurality of bins. The downstream conveyor assembly can have a top surface that is positioned in communication with at least one wall of each bin of the plurality of bins to facilitate delivery of debris into the interior space of each bin. As the base of each bin moves from the closed position toward the open position, the base can be configured to dispense debris from the interior space of the bin through the base.

Also described herein, in additional aspects, is a method for processing debris. The method can include providing at least one cart to a jobsite, transporting the at least one cart from the jobsite to a debris processing facility, and effecting engagement between at least one arm assembly of a lifting apparatus and a first cart of the at least one cart. Each cart can have a base, a plurality of wheels extending downwardly from the base relative to a vertical axis, and a plurality of walls extending upwardly from the base. The walls and the base of each cart can cooperate to define a debris-receiving space. The debris processing facility can include a lifting apparatus and a first conveyor assembly. Following engagement between the at least one arm assembly and the first cart, the method can include selectively rotating the at least one arm assembly of the lifting apparatus relative to a rotational axis to move the first cart from a resting position to an unloading position. The first cart reaches the unloading position following rotational movement of the at least one arm assembly of the lifting apparatus along an arcuate path having an arc length ranging from about 130 degrees to about 170 degrees. With the first cart in the unloading position, the first conveyor assembly can receive debris exiting the first cart. The first conveyor assembly (e.g., upstream conveyor assembly) can then deliver the debris onto a downstream conveyor assembly, which in turn, can transport the debris to a position corresponding to (e.g., in alignment or communication with) at least one bin of the plurality of bins such that the debris can be moved into the at least one bin of the plurality of bins. Once each bin of the at least one bin contains a desired amount of debris, the actuator associated with the base assembly of each bin can be activated to effect movement of the base of the bin from the closed position toward the open position. With the base situated in the open position, the debris from the at least one bin can be unloaded into at least one container positioned below the at least one bin.

In further aspects, described herein is a debris cart having a base, a plurality of wheels extending downwardly from the base relative to a vertical axis, a plurality of walls extending upwardly from the base of the base assembly, and a plurality of receptacles extending downwardly from the base. The plurality of walls cooperate with the base to define a debris-receiving space. The plurality of walls can include opposed front and back walls and opposed first and second side walls. The first and second side walls extend between and are connected to the front and back walls. Each wall of the plurality of walls has a rounded upper edge. The front and back walls have respective outer surfaces. Moving from the respective rounded upper edges of the front and back walls to the base, the outer surfaces of the front and back walls are axially tapered at a first taper angle relative to the vertical axis. The first and second side walls have respective outer surfaces. Moving from the rounded upper edge of each side wall to the base, the outer surfaces of the first and second side walls are axially tapered at a second taper angle relative to the vertical axis. The plurality of receptacles can include: a first set of receptacles having at least one row of receptacles aligned relative to a longitudinal axis extending through the opposed first and second side walls of the cart; and a second set of receptacles having at least one row of receptacles aligned relative to a transverse axis extending through the opposed walls of the cart.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE FIGURES

These and other features of the preferred embodiments of the invention will become more apparent in the detailed description in which reference is made to the appended drawings wherein:

FIG. 2 is a front elevational view of the cart of FIG. 1;

FIG. 3 is a cross-sectional side elevational of the cart of FIG. 1, taken at line 3-3;

FIG. 4 is a right side elevational view of the cart of FIG. 1;

FIG. 8B is a side elevational view of an exemplary lifting apparatus as disclosed herein;

FIG. 8C is a front elevational view of the lifting apparatus of FIG. 8B;

DETAILED DESCRIPTION

Figure 1:
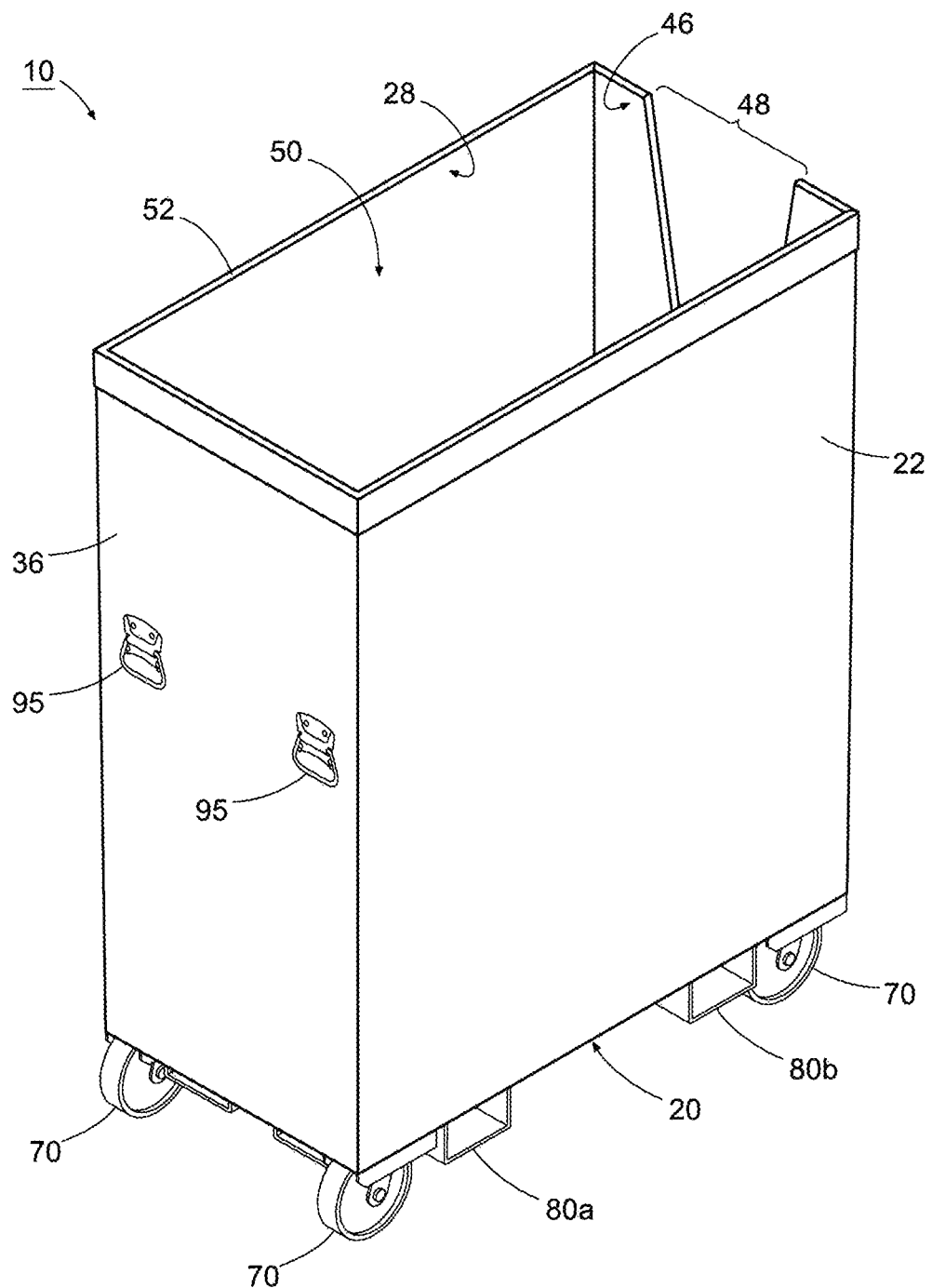
FIG. 1 is a front perspective view of an exemplary cart as disclosed herein.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" comprise plural referents unless the context clearly dictates otherwise. Thus, for example, reference to "an engagement element" can comprise two or more such engagement elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description comprises instances where said event or circumstance occurs and instances where it does not.

The word "or" as used herein means any one member of a particular list and also comprises any combination of members of that list.

As used herein, the terms "first conveyor assembly" and "upstream conveyor assembly" are used interchangeably to refer to a conveyor assembly that is configured to receive debris from at least one cart when the cart is in an unloading position, as described herein.

As used herein, the terms "second conveyor assembly" and "downstream conveyor assembly" are used interchangeably to refer to a conveyor assembly that receives debris from a first conveyor assembly or an upstream conveyor assembly as disclosed herein. Optionally, the second conveyor assembly and the downstream conveyor assembly can be configured to deliver debris toward a plurality of bins, as described herein.

Described herein with reference to FIGS. 1-15 are carts, bins, systems, and methods for processing debris. As used herein, the term "debris" refers to any discarded material, including, for example and without limitation, waste materials, rubbish, and the remains of broken down or destroyed materials.

Figure 5:
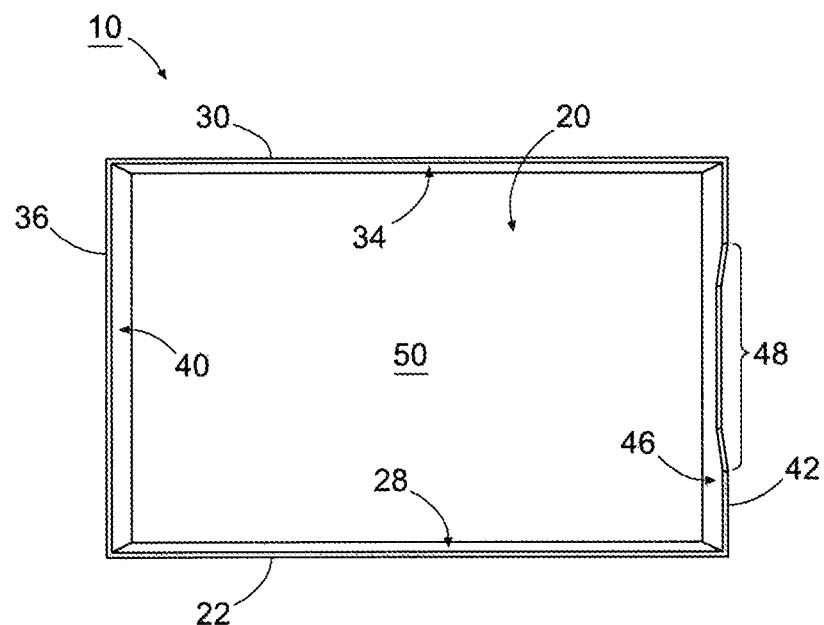
FIG. 5 is a top plan view of the cart of FIG. 1.
Figure 16:
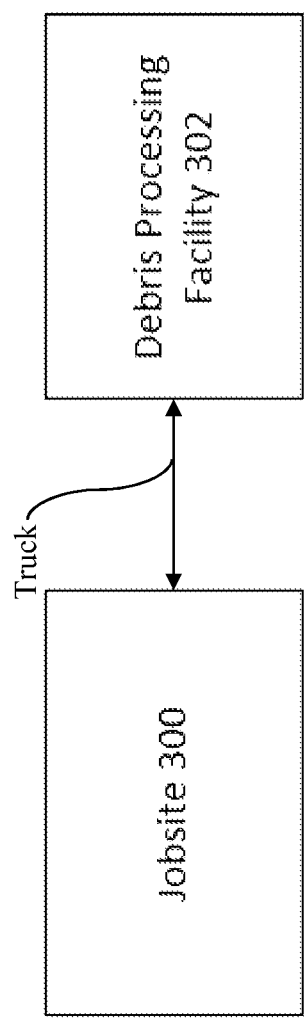
FIG. 16 illustrates a system in accordance with embodiments disclosed herein.

In exemplary aspects, a system 100 for processing debris can comprise at least one cart 10. In these aspects, the cart 10 can have a base 20, a plurality of wheels 70 extending downwardly from the base relative to a vertical axis 12, and a plurality of walls 22, 30, 36, 42 extending upwardly from the base. It is contemplated that the base can optionally have a rectangular shape, although other shapes are possible. The wheels 70 can permit selective movement of the cart 10 to achieve desired positioning and orientation of the cart. Optionally, in exemplary aspects, the wheels 70 can comprise casters as are known in the art. In these aspects, it is contemplated that the plurality of wheels 70 can comprise four casters positioned proximate respective corners of the base 20 as shown in FIGS. 1-6. Optionally, the casters can be polyurethane casters, such as, for example and without limitation, six-inch polyurethane casters as are known in the art. It is contemplated that the use of casters can provide stability to the cart 10 while also making the cart easier to roll and reducing floor markings. In exemplary aspects, the casters can comprise a pair of swivel casters positioned proximate either the first or second side wall and a pair of rigid/fixed casters positioned proximate the other side wall. As shown in FIGS. 1 and 5, the walls 22, 30, 36, 42 and the base 20 of each cart 10 can cooperate to define a debris-receiving space 50. In use, the debris-receiving space 50 can be configured to receive debris as further disclosed herein. Optionally, although not shown, with further reference to FIGS. 11 and 16, it is contemplated that each cart 10 can be provided with a lid that contains and conceals debris within the cart as the cart is selectively moved around a jobsite 300 or debris processing facility 302. In exemplary aspects, each cart 10 can comprise a lid formed from hard plastic as is known in the art. In further exemplary aspects, each cart 10 can comprise a lid formed from a rimmed lid comprising soft elastic material as is known in the art. It is contemplated that the lid of each cart can comprise a single-piece lid or a plurality of lid portions that are independently moveable and that cooperate to define the lid. In exemplary aspects, it is contemplated that the lid can be pivotally coupled to one of the walls of the cart in a conventional manner (e.g., by a hinge connection). Optionally, in further exemplary aspects, it is contemplated that each cart 10 can be provided with one or more exterior bumper assemblies as are known in the art to reduce and/or eliminate scuffing or damage to walls and other surfaces as the carts are moved throughout a jobsite 300 or debris processing facility 302.

In further exemplary aspects, as shown in FIGS. 1-6, the plurality of walls of each cart 10 can comprise opposed front and back walls 22, 30 and opposed first and second side walls 36, 42 that extend between and are connected to the front and back walls. In these aspects, it is contemplated that each wall of the plurality of walls of each debris cart 10 can have a rounded upper edge 52. It is contemplated that the rounded (e.g., capped) edges of each cart 10 can prevent and/or reduce hand or limb injury during use of the cart. In still further exemplary aspects, the front and back walls 22, 30 of each cart have respective outer surfaces 26, 32 and respective inner surfaces 28, 34. In these aspects, as shown in FIG. 4, moving from the respective rounded upper edges 52 of the front and back walls 22, 30 to the base 20 of the cart 10, the outer surfaces 26, 32 of the front and back walls can be axially tapered at a first taper angle 54 relative to the vertical axis 2. In exemplary aspects, it is contemplated that the first taper angle 54 can range from about 0.3 degrees to about 10 degrees, from about 0.4 degrees to about 5 degrees, or from about 0.5 degrees to about 1.5 degrees. In still further exemplary aspects, the first and second side walls 36, 42 can have respective outer surfaces 38, 44 and respective inner surfaces 40, 46. In these aspects, moving from the rounded upper edge 52 of each side wall 36, 42 to the base of the cart 10, the outer surfaces 38, 44 of the first and second side walls can be axially tapered at a second taper angle 56 relative to the vertical axis 2. In exemplary aspects, it is contemplated that the first taper angle 54 can range from about 0.3 degrees to about 10 degrees, from about 0.4 degrees to about 5 degrees, from about 0.5 degrees to about 3 degrees, or from about 0.5 degrees to about 1.5 degrees. In exemplary aspects, the front and back walls 22, 30 of the cart 10 can have a variable length that varies from a first length 64 at a top portion of the cart to a second length 66 at the base 20 of the cart. Optionally, in these aspects, it is contemplated that the first length 64 can range from about 30 inches to about 70 inches, from about 35 inches to about 65 inches, from about 40 inches to about 60 inches, from about 40 inches to about 45 inches, or from about 50 inches to about 60 inches. Optionally, it is contemplated that the first length can be about 55 inches and the second length can be about 53 inches. Alternatively, it is contemplated that the first length can be about 43 inches and the second length can be about 40 inches. In exemplary aspects, the first and second side walls 36, 42 of the cart 10 can have a variable width that varies from a first width 60 at a top portion of the cart to a second width 62 at the base 20 of the cart. Optionally, in these aspects, it is contemplated that the first width 60 can range from about 15 inches to about 45 inches, from about 20 inches to about 40 inches, from about 25 inches to about 35 inches, from about 25 inches to about 30 inches, or from about 30 inches to about 35 inches. Optionally, it is contemplated that the first width can be about 32 inches and the second width can be about 30 inches. Alternatively, it is contemplated that the first width can be about 28 inches and the second width can be about 26 inches. In still further aspects, it is contemplated that the walls of the cart 10 can have a consistent height 58 ranging from about 40 inches to about 60 inches or from about 45 inches to about 55 inches. Optionally, the height 58 can be about 51 inches.

Figure 7:
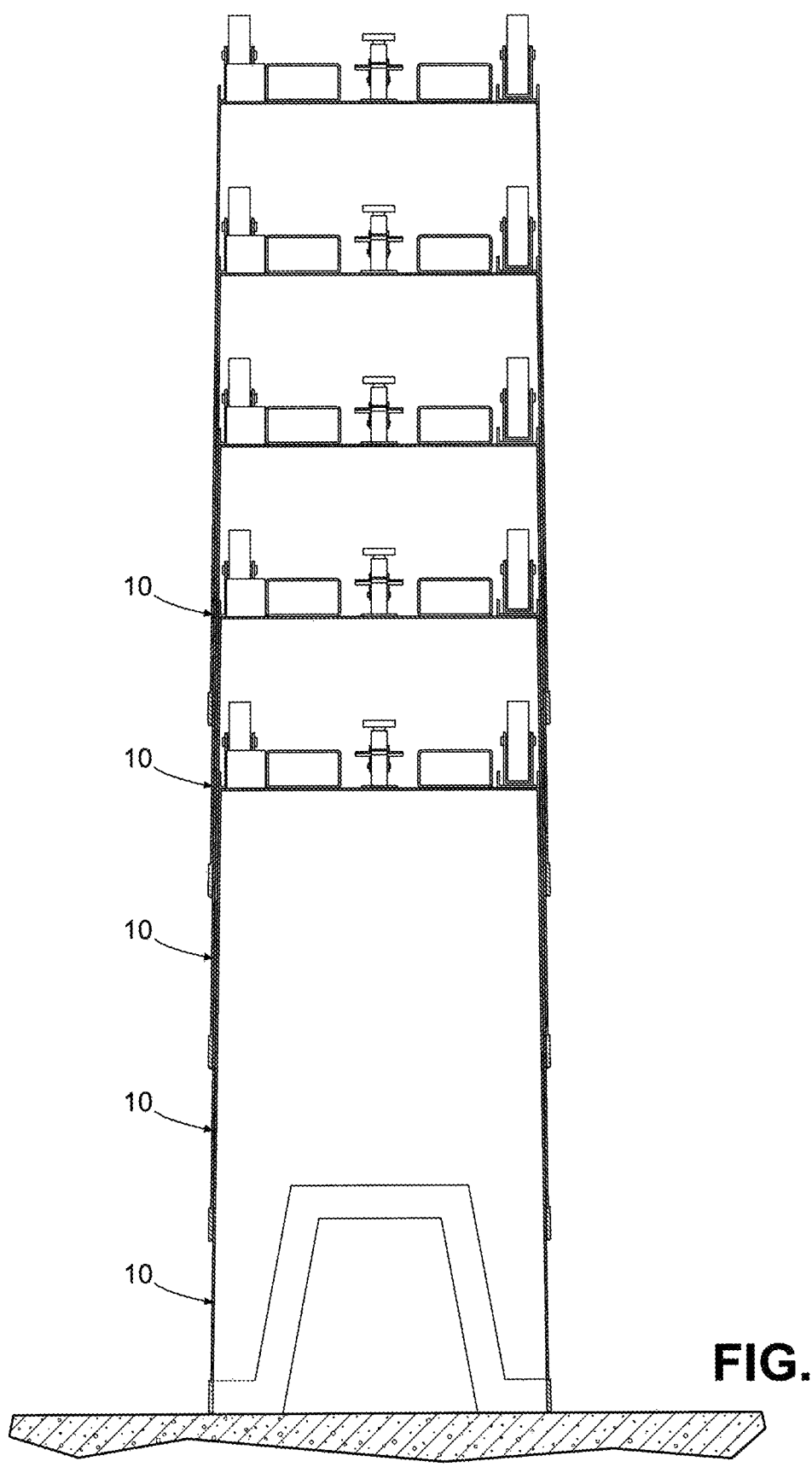
FIG. 7 is a cross-sectional side elevational view of a plurality of carts positioned in a stacked configuration as disclosed herein.

In use, it is contemplated that the tapering of the walls 22, 30, 36, 42 of the carts 10 disclosed herein can provide for easy release of materials positioned within the debris-receiving space 50. As shown in FIG. 7, it is contemplated that the tapering of the walls 22, 30, 36, 42 of the carts 10 disclosed herein can permit stacking of groups of carts, thereby providing for easy storage and/or transport of the carts while minimizing the amount of space occupied by the carts. Thus, it is contemplated that the tapering of the walls of the carts 10 can serve both an ornamental and a functional purpose.

Optionally, as shown in FIGS. 1-7, at least one of the side walls 36, 42 of the cart 10 can comprise a slot 48 that permits access to material positioned within the debris-receiving space 50 of the cart. In exemplary aspects, the slot can have a substantially trapezoidal shape as shown in FIGS. 1 and 3-4. However, it is contemplated that any shape can be used to form the slot 48. In further exemplary aspects, as shown in FIGS. 1 and 3-4, it is contemplated that the slot can extend downwardly from portions of the rounded upper edge 52 of the cart 10. Alternatively, it is contemplated that the side wall 36, 42 can entirely enclose the slot 48. Optionally, it is contemplated that the slot can be provided with a cover. Optionally, in one aspect, the slot 48 can be defined in the side wall 36, 42 having swivel casters as further disclosed herein.

Figure 6:
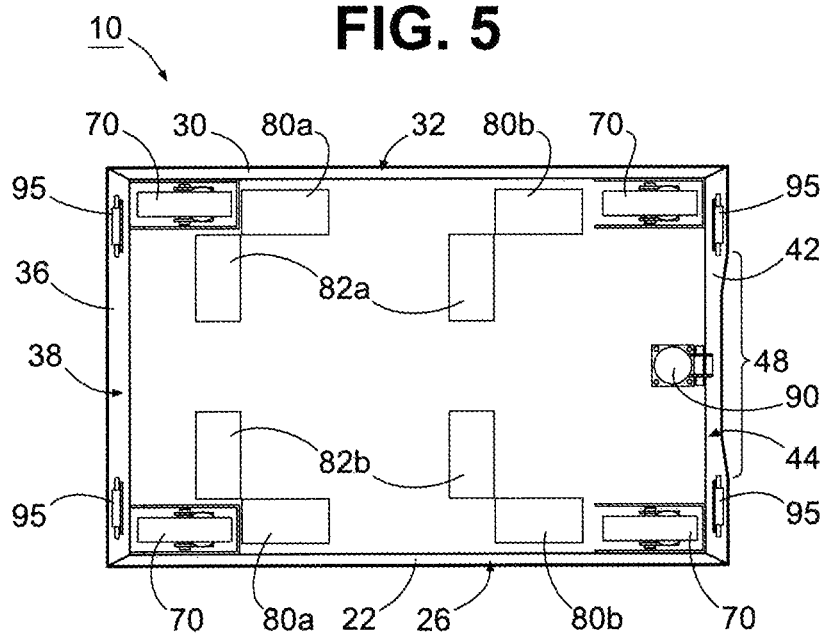
FIG. 6 is a bottom plan view of the cart of FIG. 1.

As shown in FIGS. 1-6, each debris cart 10 can comprise a plurality of receptacles extending downwardly from the base 20. It is contemplated that the receptacles can optionally have a substantially rectangular shape; however, it is contemplated that any shape complementary to the lifting apparatus (e.g., a round shape) can be used. Optionally, in exemplary aspects, the plurality of receptacles can comprise a first set of receptacles 80a, 80b having at least one row of receptacles aligned relative to a longitudinal axis 4 extending through the opposed first and second side walls 36, 42 of the cart and being perpendicular to the vertical axis 2. Optionally, in these aspects, it is contemplated that the plurality of receptacles can further comprise a second set of receptacles 82a, 82b having at least one row of receptacles aligned relative to a transverse axis 16 extending through the opposed front and back walls 22, 30 of the cart and being perpendicular to the vertical axis 2 and the longitudinal axis 4. As shown in FIG. 6, it is contemplated that each set of receptacles can comprise a plurality of rows of aligned receptacles.

In further exemplary aspects, it is contemplated that the cart 10 can comprise at least one floor lock 90, such as a conventional floor lock brake as is known in the art. In these aspects, it is contemplated that the floor lock 90 can extend downwardly from the base 20 and be configured for selective engagement by a worker (for example, by a worker's foot) to activate the floor lock. In exemplary aspects, as shown in FIG. 6, it is contemplated that the floor lock 90 can be positioned between (optionally, centered between) a pair of wheels 70 (e.g., casters) on one side of the cart 10. Optionally, in these aspects, it is contemplated that the wheels 70 can comprise a pair of swivel casters positioned on the same side of the cart as the floor lock 90, thereby permitting optimum control of the cart.

In still further exemplary aspects, the cart 10 can comprise a plurality of folding (e.g., hinged) handles 95 that are secured to at least one side wall 36, 42 of the cart. In these aspects, it is contemplated that the folding handles 95 can permit manual control of the movement of the cart 10, while the folding of the handles ensures that the carts have a reduced profile during transport and stacking (for example, in tight spaces). Optionally, handles 95 can be secured to both side walls 36, 42.

In still further exemplary aspects, each cart can be assigned a unique identifier and provided with indicia of the unique identifier. Exemplary forms of indicia include barcodes, radiofrequency identification (RFID) tags, sensors, and the like. In use, it is contemplated that these forms of indicia can be used to track the location of a particular cart 10 and provide a system controller 160 as further disclosed herein with the ability to associate information with the unique identifier of the cart.

Optionally, in exemplary aspects, it is contemplated that the cart 10 can be constructed entirely from steel, thereby limiting and/or preventing side bulging and mechanical failure. In further exemplary aspects, it is contemplated that the walls of the cart 10 can be seem-welded to prevent and/or minimize liquid escape from the debris-receiving space 50.

Figure 8A:
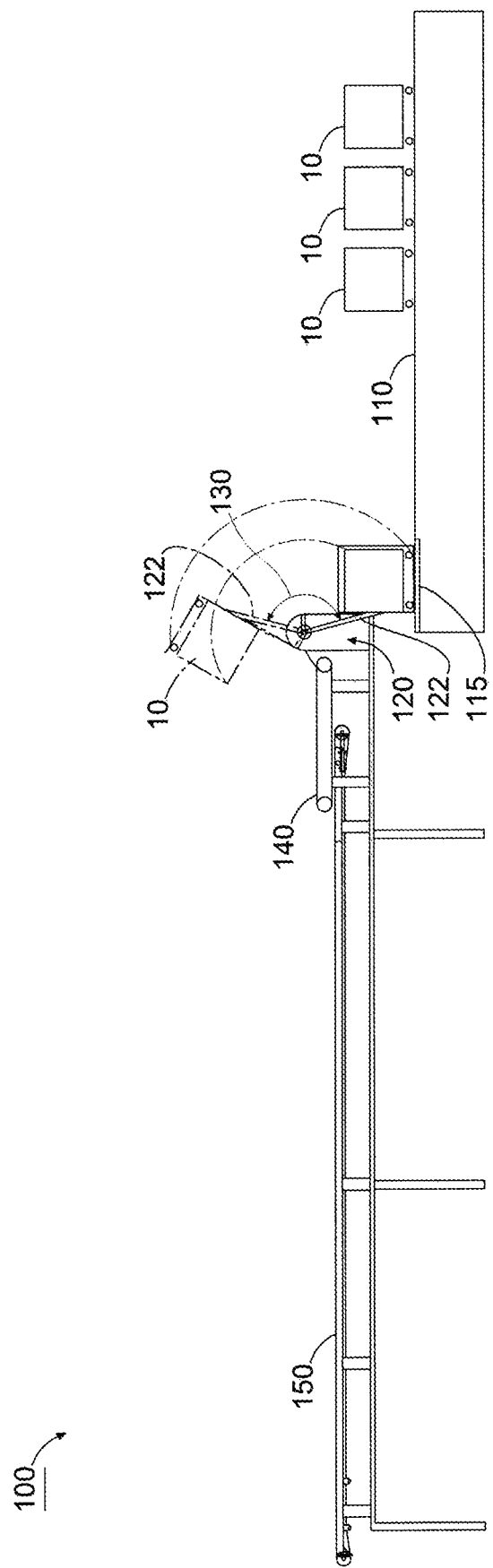
FIG. 8A is a schematic diagram depicting an exemplary system for processing debris as disclosed herein.

In further aspects, and with reference to FIGS. 8A-8C, the system 100 can further comprise a lifting apparatus 120 having at least one arm assembly configured to engage a portion of the base 20 of a respective cart 10 of the at least one cart when the cart is in a resting position. Optionally, in these aspects, it is contemplated that the resting position can correspond to a position in which the wheels 70 of the cart 10 are resting on a flat surface. Following engagement between the at least one arm assembly and the cart 10, the at least one arm assembly of the lifting apparatus 120 can be selectively rotatable relative to a rotational axis 123 to move the cart about and between the resting position and an unloading position. In exemplary aspects, the lifting apparatus 120 can comprise an axle 124 through which the rotational axis 123 passes. As shown in FIG. 8A, the cart 10 can reach the unloading position following rotational movement of the at least one arm assembly of the lifting apparatus 120 along an arcuate path having an arc length 130 ranging from about 105 to about 175 degrees and more preferably, from about 130 degrees to about 170 degrees.

In exemplary aspects, the lifting apparatus 120 can comprise an actuator coupled to the at least one arm assembly of the lifting apparatus. In these aspects, the actuator can be configured to effect selective rotational movement of the at least one arm assembly of the lifting apparatus 120. It is contemplated that the actuator can be any conventional actuator that is capable of creating rotational movement of the lifting apparatus 120. In exemplary aspects, it is contemplated that the actuator can be a hydraulic actuator; however it is contemplated that other rotational actuators (e.g., pneumatic, mechanical, or electromechanical actuators) can be used.

Figure 11:
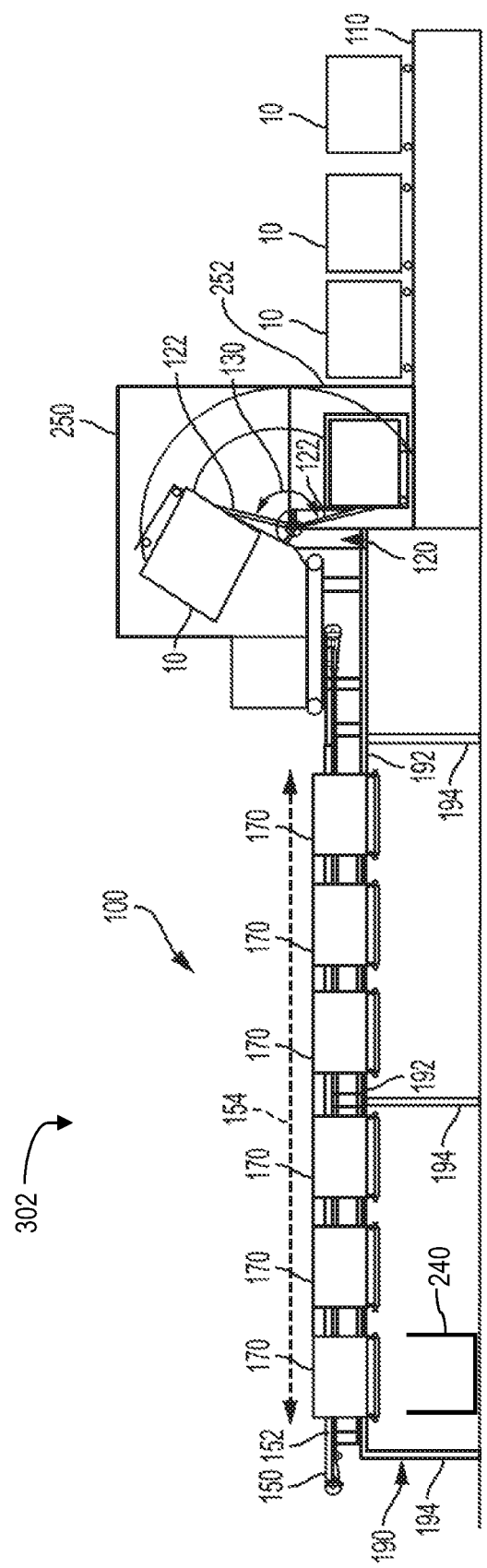
FIG. 11 is a schematic diagram depicting an exemplary system for processing debris that includes a plurality of bins as disclosed herein.
Figure 12:
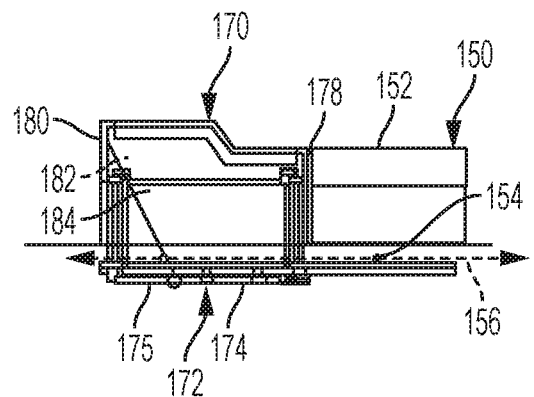
FIG. 12 is a side view of an exemplary system for processing debris, showing a downstream conveyor assembly having a top surface that is positioned in communication with at least one wall of a bin as disclosed herein.

Optionally, as shown in FIG. 11, it is contemplated that the system can comprise a housing 250 that at least partially encloses or surrounds the lift apparatus 120. Optionally, the housing 250 can comprise at least one wall (e.g., a plurality of walls) that surrounds at least a portion of the area where active rotational movement of the carts occurs. In these aspects, the housing 250 can improve the safety of unloading operations by shielding system operators from the active unloading area. In exemplary aspects, the housing 250 can define a lift door 252 as further disclosed herein. In these aspects, the lift door can receive individual carts prior to unloading. It is contemplated that opening, closing, and locking of the lift door can be selectively controlled as disclosed herein by the system controller, which can be communicatively coupled to an actuator (e.g., a linear actuator, such as a hydraulic, pneumatic, mechanical, or electromechanical actuator) that is configured to selectively move the lift door about and between an open position and a closed position. As further disclosed herein, the lift door can be closed (and locked) to restrict inadvertent entry of additional carts until processing of a particular cart is completed.

Optionally, the housing can comprise containment walls that extend along at least a portion of the length of the conveyor assembly disclosed herein.

In further exemplary aspects, and with reference to FIGS. 8A-8C, each arm assembly of the lifting apparatus 120 can comprise an arm 122, which can be secured or otherwise coupled to axle 124, and at least one engagement element 128 coupled to the arm and configured to engage the base 20 of the cart 10. Optionally, in these aspects, it is contemplated that each receptacle 80a, 80b, 82a, 82b of the cart can be configured to receive a corresponding engagement element 128 of the lifting apparatus 120. It is further contemplated that the at least one engagement element 128 can be configured to engage either the first set of receptacles 80a, 80b or the second set of receptacles 82a, 82b of each cart 10 depending upon the orientation of the cart. Thus, it is contemplated that the cart can engage the arm assembly in any orientation (with either the front or back wall facing the arm assembly or one of the side walls facing the arm assembly). In use, each engagement element 128 can extend at least partially within each receptacle of a corresponding set of receptacles. Upon activation of the lifting apparatus, the arm assembly rotates relative to the arcuate path. As shown in FIG. 8A, the engagement elements 128 and the base 20 of the cart 10 are initially positioned in a horizontal (0 degree) orientation. However, following movement of the lifting apparatus to the unloading position, the engagement elements 128 and the base 20 of the cart 10 are positioned at an obtuse angle (corresponding to arc length 128) relative to the ground, with the inner surface of the base 20 (and the debris-receiving space 50) facing the ground, thereby permitting gravity-assisted unloading of debris from the cart.

In exemplary aspects, the at least one engagement element 128 of each arm assembly can be pivotally coupled to the arm 122 of the arm assembly. FIG. 8B depicts an exemplary pivot point 125 where the at least one engagement element 128 can be pivotally coupled to the arm 122. Optionally, in these aspects, the arm assembly can further comprise a mount 126 to which the at least one engagement element 128 is secured (e.g., mounted), and the mount can be pivotally coupled to the arm 122 at the pivot point 125, thereby pivotally coupling the at least one engagement element to the arm. The pivot point 125 can comprise a conventional pivotal connection, such as, for example and without limitation, a pin connection. In use, it is contemplated that the pivotal connection (at pivot point 125) can permit adjustment of the position of the at least one engagement element 128 to provide for optimal positioning of the engagement elements relative to the cart 10. For example, it is contemplated that the mount 126 (and the engagement elements 128) can be rotated at the pivot point 125 to adjust the vertical location of the engagement elements. In still further aspects, the arm 122 can optionally comprise a plurality of openings or slots spaced along the length of the arm, with each opening (or group of aligned openings) being configured to receive a pin to thereby permit adjustment of the location of the pivot point 125 (by allowing for pivotal coupling of the mount 126 at a variety of locations relative to the length of the arm). Optionally, in further aspects, it is contemplated that the at least one engagement element 128 can be configured for selective axial movement relative to the rotational axis 123. In these aspects, it is contemplated that the arm 122 can be slidingly coupled to a pin to permit axial movement of the arm 122 (and consequently, the mount 126 and engagement elements 128) relative to the rotational axis 123. Alternatively, it is contemplated that the mount 126 can be slidingly coupled to a pin secured at a distal portion of the arm 122 to permit axial movement of the mount (and consequently, the engagement elements 128) relative to the rotational axis. Thus, in use, it is contemplated that the pivot point 125 can optionally provide for selective vertical and/or horizontal movement of the at least one engagement element 128, thereby ensuring optimal engagement with a cart 10 as further disclosed herein. Optionally, it is contemplated that one or more actuators can be coupled to the mount, the arm, and/or the engagement elements to effect desired rotational or axial movement of the engagement elements as disclosed herein. Following movement of the at least one engagement element as disclosed herein, it is contemplated that the mount and/or engagement elements can be locked in a desired position relative to the arm using conventional locking mechanisms.

Optionally, it is further contemplated that the engagement elements can be selectively replaceable. For example, it is contemplated that a first engagement element assembly can be detached from the mount and/or arm and replaced with a second engagement element assembly that is more compatible with a given type of cart. In exemplary aspects, it is contemplated that the at least one engagement element can be secured to the mount using conventional fasteners as are known in the art. Alternatively, it is contemplated that the at least one engagement element can be integrally formed with or permanently secured to the mount 126. Optionally, in exemplary aspects, it is contemplated that each engagement element can be independently axially moveable relative to at least one other engagement element. In these aspects, it is contemplated that the engagement elements can be slidingly coupled to a portion of the mount and/or a portion of the arm to permit selective, independent movement of the engagement elements relative to the rotational axis 123. In these aspects, it is further contemplated that individual engagement elements can be selectively axially moved relative to the rotational axis 123 to create desired spacing between the engagement elements, as may be required when carts having varying receptacle configurations are used.

In exemplary aspects, it is contemplated that the at least one engagement element 128 can comprise a plurality of elongate fingers as shown in FIGS. 8B-8C. Optionally, the plurality of elongate fingers can be oriented substantially parallel to one another to define a "fork" configuration. When the cart 10 comprises a plurality of rows of aligned receptacles, it is contemplated that engagement between the plurality of elongate fingers can occur when each finger is received within at least a portion of each receptacle within a corresponding row of receptacles.

In additional aspects, and with reference to FIG. 8A, the system 100 can further comprise a first conveyor assembly 140 configured to receive debris from the at least one cart 10 when the at least one cart is in the unloading position. Optionally, in various exemplary aspects, the system 100 can still further comprise a second conveyor assembly 150. In these aspects, the second conveyor assembly 150 can be positioned downstream of the first conveyor assembly 140 such that the first conveyor assembly 140 is configured to deliver debris to the second conveyor assembly at a selectively adjustable rate. It is contemplated that the conveyor can support and operate at multiple, selectively adjustable speeds (e.g., normal speed, slow speed, and jog mode). Optionally, the jog mode can trigger the conveyor belts to move a specified distance (e.g., two feet), pause for a period of time (e.g., 30 seconds) and then repeat this sequence of movement and pausing. It is contemplated that the jog mode can ensure that the volume of debris delivered to the second (e.g., downstream) conveyor is maintained at a manageable level for performing downstream debris processing tasks.

Figure 10A:
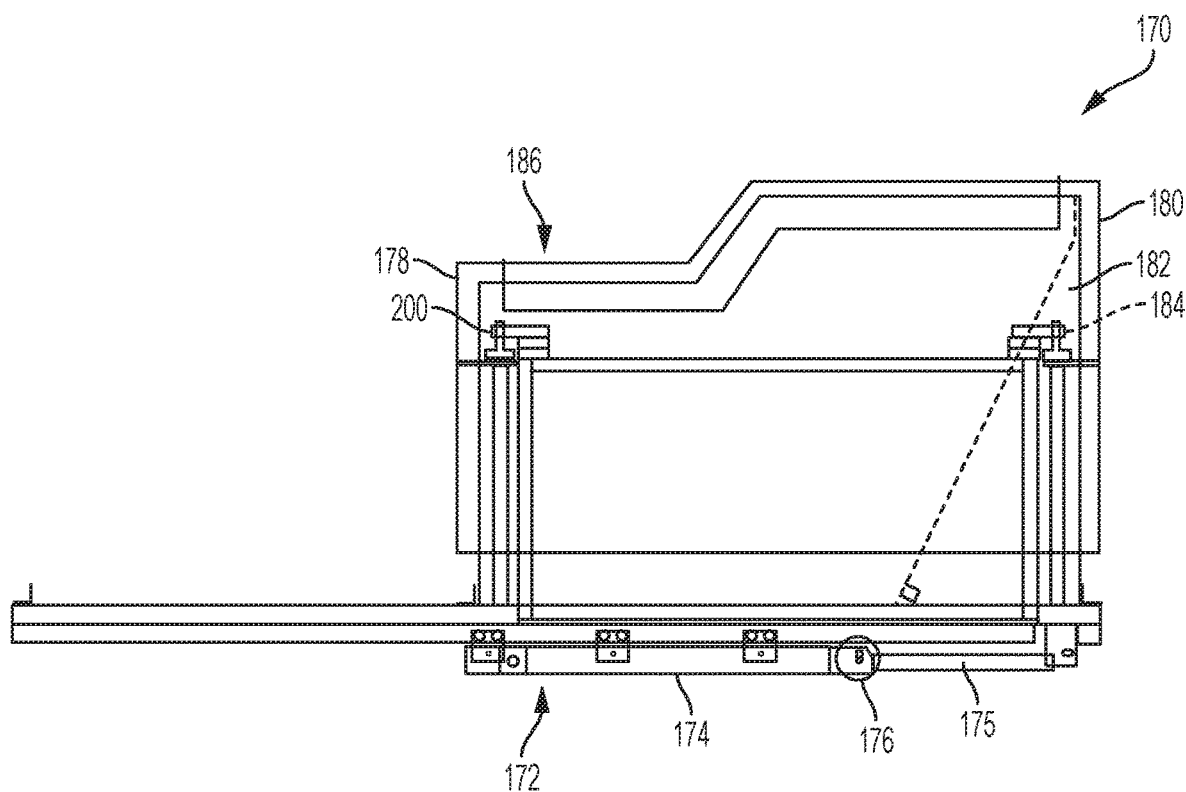
FIG. 10A is a side view of an exemplary bin having a base situated in a closed position as disclosed herein.

In further exemplary aspects, and with reference to FIGS. 10A-15, the system 100 for processing debris can comprise a plurality of bins 170 capable of receiving debris 230. In these aspects, and as shown in FIGS. 10A-10C, each bin of the plurality of bins 170 can include a base assembly 172 and at least one wall (e.g., a plurality of walls 178, 180, 182, 184). The base assembly 172 can comprise a base 174 (e.g., a panel or door) and an actuator 175. The base 174 can be configured for selective movement about and between an open position and a closed position. In the closed position, the base 174 can cooperate with the at least one wall (e.g., the plurality of walls) to define a receptacle for debris received within the bin 170, with the base 174 providing support below the debris within the bin. In the open position, the base 174 can move (e.g., translate, rotate, pivot, and the like) relative to the at least one wall of the bin to thereby define an opening through which debris can pass (in a downward direction). Optionally, it is contemplated that the base 174 can have a rectangular shape, although other shapes are possible. In further aspects, the actuator 175 can be operatively coupled to the base 174. In these aspects, the actuator 175 can be operable to effect selective movement of the base about and between the open position and the closed position. Optionally, the actuator 175 can effect movement of the base relative to a transverse axis 156, which can be perpendicular to a conveyor axis 154, as further described herein. Optionally, the actuator 175 can be configured to effect selective axial movement of the base 174. Alternatively, the actuator 175 can be configured to effect a selective rotational movement of the base 174. It is contemplated that the actuator 175 can be any conventional actuator that is capable of effecting rotational or linear movement of the base. For example, it is contemplated that the actuator 175 can be a hydraulic actuator; however it is contemplated that other rotational or linear actuators (e.g., pneumatic, mechanical, or electromechanical actuators) can be used. In further exemplary aspects, it is contemplated that the base assembly can comprise at least one roller or wheel 176 that is coupled to the base 174 and that engages a guide rail extending parallel or substantially parallel to the transverse axis (and, optionally, operatively associated with the actuator 175). In use, the guide rail can be configured to facilitate movement of the base 174 along the direction of movement. Optionally, opposing rollers/wheels 176 and corresponding opposing guide rails can be provided on opposite sides of each bin.

Figure 10B:
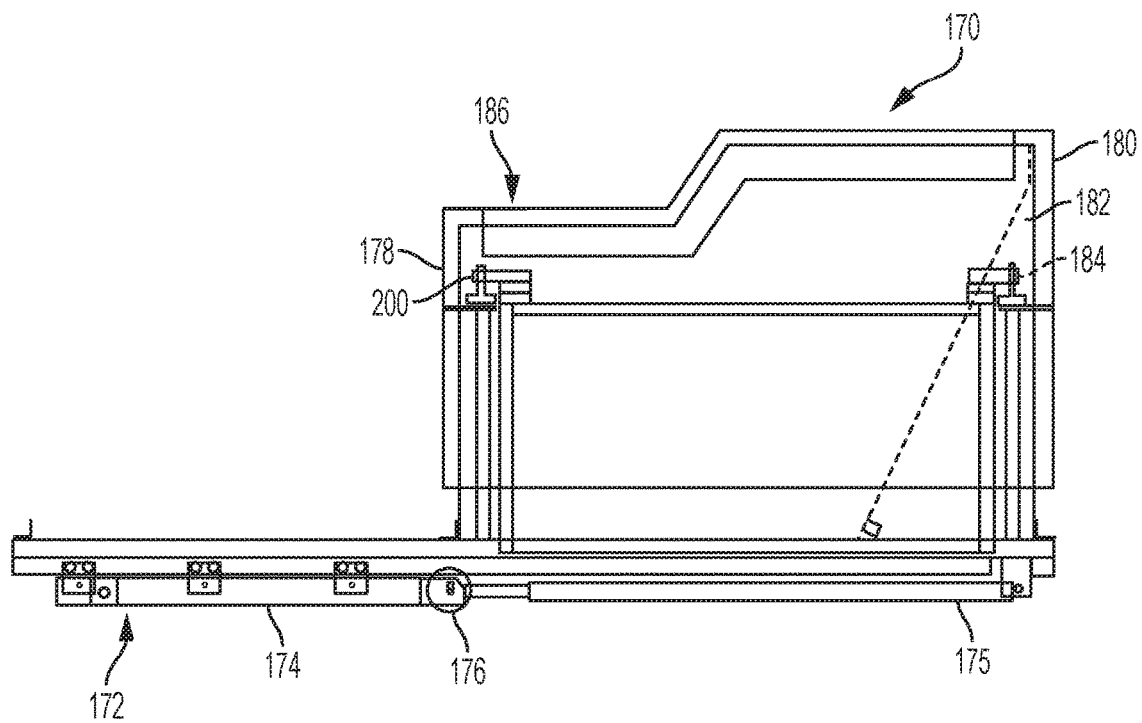
FIG. 10B shows the exemplary bin of FIG. 10A, with the base moved to an open position as disclosed herein.
Figure 10C:
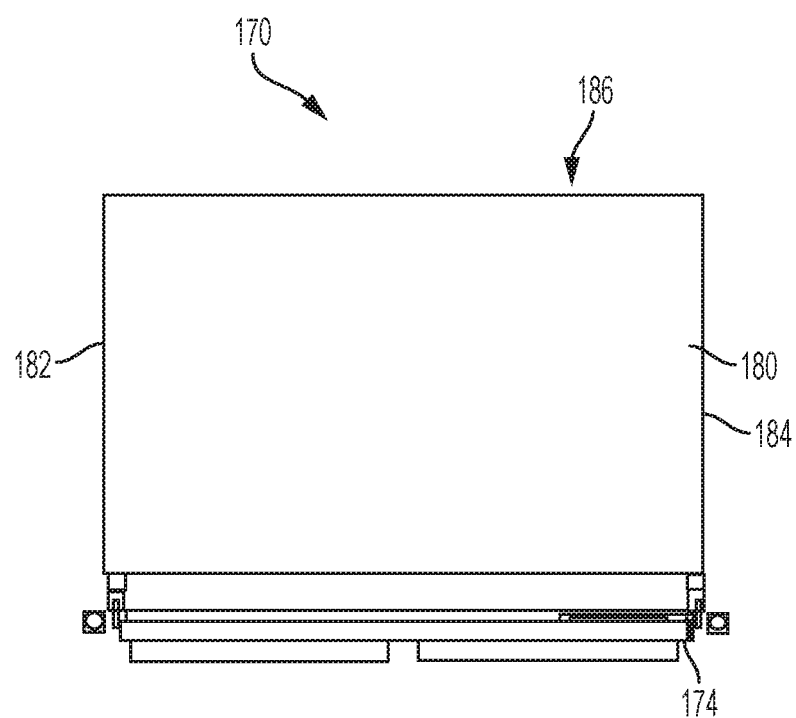
FIG. 10C is a rear view of the exemplary bin of FIG. 10A.

In further exemplary aspects, as shown in FIGS. 10A-10C, the plurality of walls 178, 180, 182, 184 of each bin 170, when present, can comprise opposed front and back walls 178, 180 and opposed first and second side walls 182, 184 that extend between and are connected to the front and back walls. In these aspects, it is contemplated that each wall of the plurality of walls 178, 180, 182, 184 of each bin 170 can have a rounded upper edge. It is contemplated that the rounded (e.g., capped) edges of each bin 170 can prevent and/or reduce hand or limb injury during use of the cart. In still further exemplary aspects, the front and back walls 178, 180 of each bin 170 can have respective outer surfaces and respective inner surfaces. In still further exemplary aspects, the first and second side walls 182, 184 can have respective outer surfaces and respective inner surfaces. In exemplary aspects, the inner surface of at least one of the walls 178, 180, 182, 184 (optionally, a plurality of the walls or each of the walls) can be inwardly sloped (moving in a downward direction) to promote the exit of debris from the bin when the base is in the open position.

In further exemplary aspects, the front and back walls 178, 180 of the bin 170 can have different heights. It is contemplated that the height of the front wall 178 can be greater than the height of the back wall 180. Alternatively, it is contemplated that the height of the back wall 180 can be greater than the height of the front wall 178. Optionally, in these aspects, it is contemplated that the height of the front wall 178 can range from about 30 inches to about 70 inches, from about 35 inches to about 65 inches, from about 40 inches to about 60 inches, from about 40 inches to about 45 inches, or from about 50 inches to about 60 inches. Optionally, in these aspects, it is contemplated that the height of the back wall 180 can range from about 30 inches to about 70 inches, from about 35 inches to about 65 inches, from about 40 inches to about 60 inches, from about 40 inches to about 45 inches, or from about 50 inches to about 60 inches. Optionally, it is contemplated that the height of the front wall 178 can be about 40 inches and the height of the back wall can be about 55 inches. In exemplary aspects, the first and second side walls 182, 184 of the bin 170 can have a variable height that varies from a first height proximate the front wall 178 to a second height proximate the back wall 180 of the bin 170. In these aspects, the first height of the side walls 182, 184 can range from about 30 inches to about 70 inches, from about 35 inches to about 65 inches, from about 40 inches to about 60 inches, from about 40 inches to about 45 inches, or from about 50 inches to about 60 inches. In these aspects, it is contemplated that the second height of the side walls 182, 184 can range from about 30 inches to about 70 inches, from about 35 inches to about 65 inches, from about 40 inches to about 60 inches, from about 40 inches to about 45 inches, or from about 50 inches to about 60 inches. In still further aspects, it is contemplated that the walls of the bin 170 can have a consistent height ranging from about 30 inches to about 70 inches or from about 45 inches to about 55 inches.

In further exemplary aspects, as shown in FIG. 11-14, the system 100 can further comprise a downstream conveyor 150 (or a second conveyor) configured to deliver debris 230 toward the plurality of bins 170. Optionally, the downstream conveyor 150 can be configured to deliver the debris toward the plurality of bins 170 at a selectively adjustable rate. In these aspects, the downstream conveyor assembly 150 can have a top surface 152 that can be positioned in communication with at least one wall of each bin of the plurality of bins 170 to facilitate delivery of debris into the interior space 186 of each bin. Optionally, it is contemplated that the top surface 152 of the conveyor assembly 150 can be provided at the same height, or substantially the same height, as the wall of the bin positioned adjacent the conveyor assembly 150, thereby providing for unobstructed delivery of debris into the bin (in a direction transverse to the conveyor axis 154). It is contemplated that as the base 174 of each bin 170 moves from the closed position toward the open position, the base can be configured to dispense debris from the interior space 186 of the bin through the opening created when the base is positioned in the open position.

Figure 13:
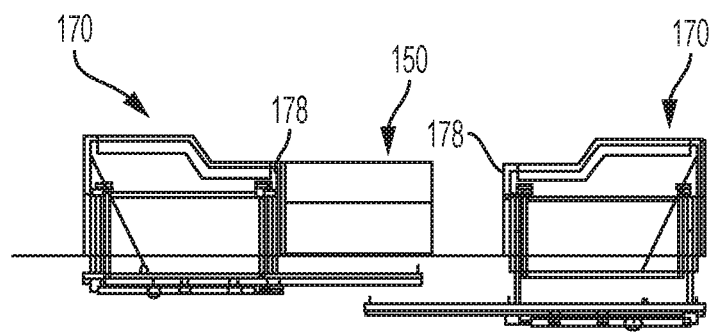
FIG. 13 is a side view of an exemplary system for processing debris, showing an arrangement in which a downstream conveyor assembly is situated between opposing bins as disclosed herein.
Figure 14:
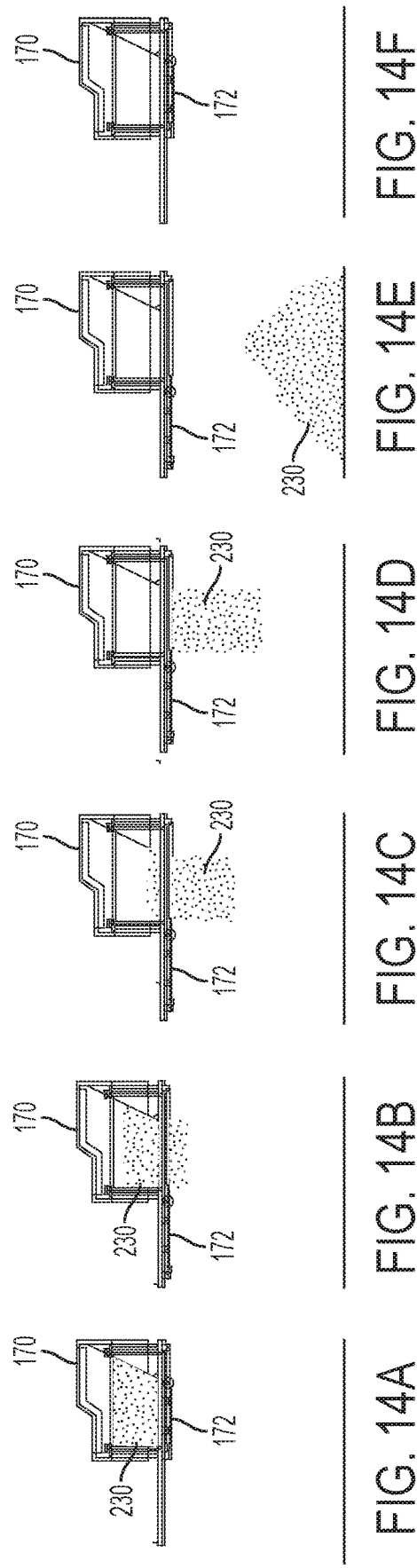
FIGS. 14A-14F are schematic diagrams of an exemplary bin, showing the sequential movement of the base from the closed position (FIG. 14A) toward the open position (FIGS. 14B-14C), followed by discharge of debris from the interior space of the bin (FIGS. 14D-14E), and subsequent return of the base to the closed position as disclosed herein (FIG. 14F)

In additional exemplary aspects, the system 100 can further comprise a support assembly 194, as shown in FIG. 11. In these aspects, the support assembly 194 can include at least one rail 192 that can extend horizontally relative to the downstream conveyor assembly 150 (parallel to a conveyor axis 154 of the conveyor assembly as further disclosed herein). In further aspects, the support assembly 190 can include a plurality of support posts 194 that support the at least one rail 192 in a desired vertical position. The plurality of support posts 194 can be coupled to and extend downwardly from the at least one rail 192. It is contemplated that the plurality of bins 170 can be securely coupled to the at least one rail 192 (e.g., fixedly mounted and spaced apart relative to the conveyor axis 154). Optionally, it is contemplated that the plurality of bins 170 can be distributed on opposing sides of the conveyor assembly 150 as shown in FIG. 13; alternatively, it is contemplated that the bins can be positioned along a single side of the conveyor assembly. It is further contemplated that the support assembly 190 can be configured to support the downstream conveyor assembly 150 at an elevated position.

Figure 15:
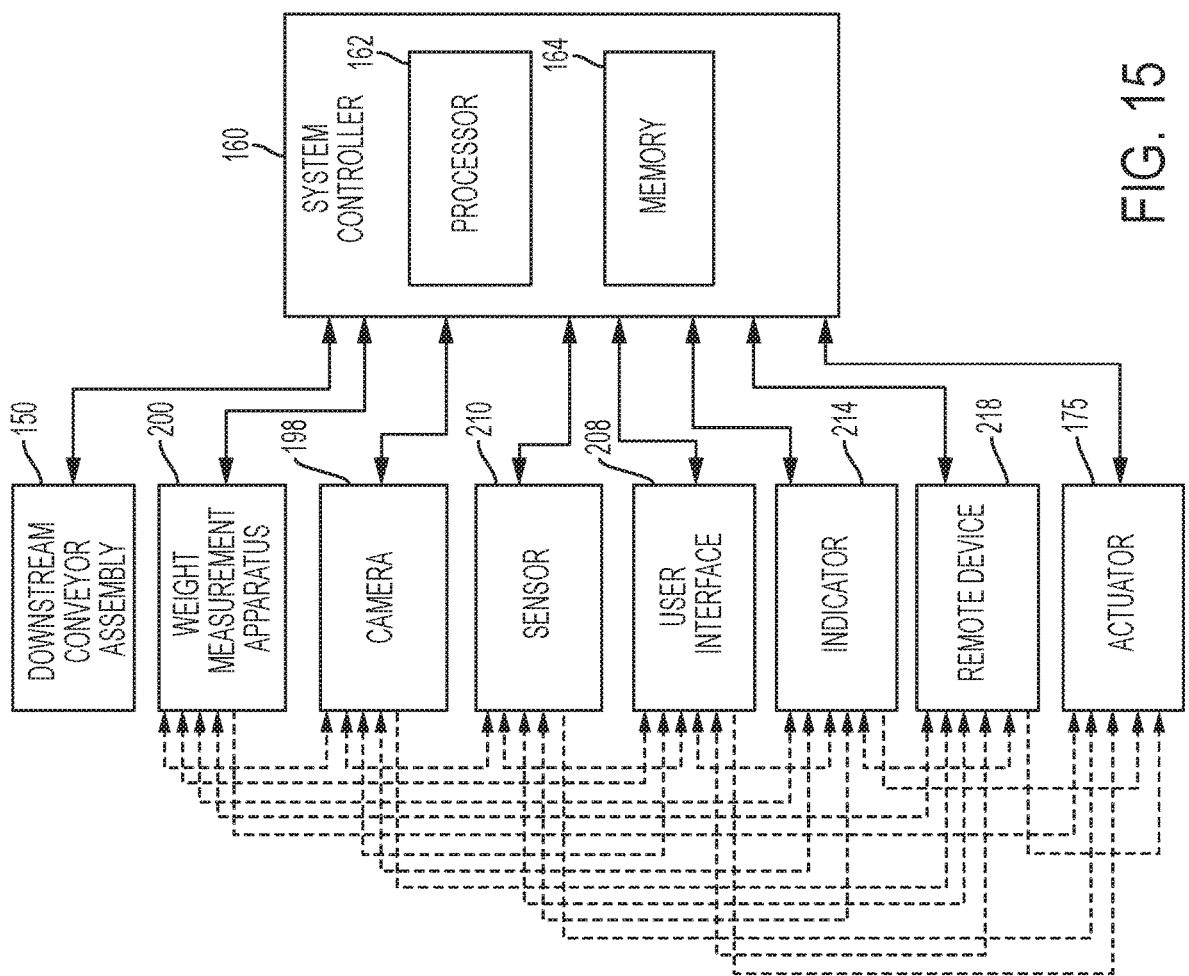
FIG. 15 is a schematic diagram depicting an exemplary system for processing debris as disclosed herein.

In additional aspects, and as shown in FIG. 15, it is contemplated that the system 100 can comprise a system controller 160 having at least one processor 162 and at least one memory 164 in communication with the at least one processor. In exemplary aspects, the system controller 160 can be communicatively coupled (optionally, via a wireless connection, such as over an Internet or cellular communication network, wireless telemetry, or radio-frequency communications, or, alternatively, via a wired connection, such as a communications cable) to the actuator 175 of each bin of the plurality of bins 170.

In further aspects, it is contemplated that each bin of the plurality of bins 170 can comprise a weight measurement apparatus 200. In some aspects, it is contemplated that the weight measurement apparatus 200 can comprise a load cell (optionally, a plurality of load cells). In optional aspects, the weight measurement apparatus can be positioned in contact with an upper end of a shaft that extends upwardly from the base 174 and is coupled to the base such that it applies a force against the load cell that is proportional to, or indicative of, the weight of debris within the bin. In these aspects, the weight measurement apparatus 200 can be configured to produce an output 204 corresponding to a weight of debris within the respective bin. Optionally, the load cell can be calibrated using conventional methods to ensure that the output produced by the load cell is indicative of the actual weight of debris within the bin. Optionally, in other aspects, rather than being coupled to a vertical shaft that extends upwardly from the base, it is contemplated that the weight measurement apparatus 200 (e.g., a load cell) can be positioned within or associated with the base. Although particular exemplary configurations of the weight measurement apparatus 200 are disclosed herein, it is contemplated that any known assembly or configuration for measuring weight of material within a container can be employed. Regardless of the form or specific location of the weight measurement apparatus 200, the system controller 160 can be configured to receive and store the output 204 from the weight measurement apparatus 200 of each respective bin of the plurality of bins 170. It is contemplated that the system controller 160 can comprise at least one programmable logic controller (PLC) communicatively coupled to the actuator 175 of each bin of the plurality of bins 170. Optionally, in exemplary aspects, the system controller 160 can comprise a plurality of PLCs, with each PLC being communicatively coupled to a respective actuator 175 of a respective bin 170. It is contemplated that other exemplary system controllers 160 can be used, including computing devices as are known in the art, such as computers, workstations, smartphones, handheld computing devices, tablets, and the like. Optionally, in operation, when the weight measurement apparatus 200 produces an output 204 indicative of a desired threshold weight within each bin, it is contemplated that the system controller 160 can be configured to effect movement of the base of the bin from the closed position to the open position in an automated manner.

Optionally, in exemplary aspects, in addition to the weight measurement apparatus within each bin, the disclosed system 100 can further comprise a plurality of sensors 210, with each sensor of the plurality of sensors 210 being positioned in association with (e.g., proximate to) a respective bin of the plurality of bins 170 and configured to produce an output 212 indicative of a desired amount of debris within the respective bin 170. It is contemplated that each sensor of the plurality of sensors 210 can be in communication with the system controller 160 such that the system controller can be configured to receive the output 212 from the respective sensor 210. Optionally, in further aspects, the plurality of sensors can comprise a plurality of height measurement sensors (e.g., non-contact displacement sensors or optical sensors), with each height measurement sensor secured proximate or within a respective bin and configured to measure a height of debris within the bin. In these aspects, it is contemplated that when the height of the debris within the bin reaches a desired value (height), the height measurement sensor (or the system controller 160, after receiving a corresponding output from the height measurement sensor) can be configured to produce an output indicative of the desired amount of debris within the bin.

In further aspects, the disclosed system 100 can comprise an indicator 214 positioned in communication with the sensor 210 and configured to receive the output 212 from the sensor or to receive an instruction from the system controller 160 corresponding to the output from the sensor. Upon receipt of the output 212 (or a corresponding instruction from the system controller 160), the indicator 214 can produce, display, or otherwise provide an alert corresponding to the output. It is contemplated that the indicator 214 can be any indicator known in the art, such as a display device, a light source, a speaker, or the like. It is further contemplated that the alert can include an audible alert, a visual alert, a signal transmitted to a remote device 218, or a combination thereof. When the alert comprises a signal that is transmitted to a remote device 218, the remote device can be communicatively coupled to the indicator 214. It is contemplated that the remote device can be communicatively coupled to the indicator 214 via a wired network or a wireless network. When a wireless network is used, it is contemplated that the signal can be transmitted over an Internet or cellular communication network or via radiofrequency communications or telemetry. In exemplary aspects, the remote device can be a computer, a mobile phone, a remote control, a tablet, or a handheld device. Following activation of the alert, the remote device can be configured to produce an activation signal. In this aspect, the activation signal can be transmitted to the actuator 175. Upon receipt of the activation signal by the actuator 175, the actuator can effect movement of the base 174 from the closed position toward the open position to permit unloading (e.g., the downward exit) of the debris 230 from the interior space 186 of the respective bin of the plurality of bins 170. It is contemplated that the disclosed system 100 can further comprise at least one container 240 positioned below a bin of the plurality of bins 170 and configured to receive the debris 230 that is unloaded from the bin.

In exemplary aspects, it is contemplated that the disclosed plurality of bins 170 and the downstream conveyor assembly 150 can be used in a system comprising the at least one cart 10 and the lifting apparatus 120 described herein. In these aspects, the downstream conveyor assembly 150 can be configured to receive debris after the debris has been unloaded from the at least one cart 10. In further aspects, the system can comprise an upstream conveyor assembly 140 (or first conveyor assembly) configured to receive debris from the at least one cart 10 when the at least one cart is in the unloading position. In these aspects, the downstream conveyor 150 can be configured to receive the debris from the upstream conveyor 140.

Optionally, in exemplary aspects, it is contemplated that the disclosed system 100 can comprise a user interface 208 that can be communicatively coupled to an indicator 214 and configured to allow a user to selectively control the activation of the indicator. In these aspects, it is contemplated that the user interface 208 can comprise a switch, a button, a touchscreen, a toggle, a keyboard, a joystick, or combinations thereof. Thus, rather than using the weight measurement apparatus 200 or the plurality of sensors 210 to automatically detect when the desired amount of debris is present within each respective bin, it is contemplated that a system operator can directly provide inputs into the user interface to effect activation of an indicator, such as for example, when the system operator observes a bin (and, optionally, analyzes outputs from the weight measurement apparatus and other sensors) and makes a determination that the desired amount of debris is present within the bin.

In the foregoing and following description, a variety of components of the system are described as being communicatively coupled to one another (or otherwise positioned in communication with one another). As used herein, this terminology is intended to encompass both direct wireless or wired connections as well as indirect wireless or wired connections, through the system controller (or other components of the system). A schematic diagram depicting exemplary, non-limiting communications among the system components is provided in FIG. 15. Where wireless connections are or may be used, it is contemplated that the system components disclosed herein can comprise suitable transmitters or receivers for performing the stated action. Such transmitters and receivers are well known in the art and will not be discussed in detail herein.

In exemplary aspects, the disclosed system can be used in a method for processing debris. In one aspect, the method can comprise providing at least one cart to a jobsite. In another aspect, the method can comprise transporting the at least one cart from the jobsite to a debris processing facility. In this aspect, it is contemplated that the debris processing facility can comprise a lifting apparatus and a first conveyor assembly as disclosed herein. In a further aspect, the method can comprise effecting engagement between at least one arm assembly of a lifting apparatus and a first cart of the at least one cart. In another aspect, following engagement between the at least one arm assembly and the first cart, the method can further comprise selectively rotating the at least one arm assembly of the lifting apparatus relative to a rotational axis to move the first cart from a resting position to an unloading position as disclosed herein. Optionally, when an actuator is coupled to the at least one arm assembly of the lifting apparatus, and the actuator can effect the selective rotational movement of the at least one arm assembly of the lifting apparatus. In a further aspect, with the first cart in the unloading position, the first conveyor assembly receives debris exiting the first cart. In still another aspect, the method can further comprise selectively adjusting a speed of the first conveyor assembly to deliver debris to a second conveyor assembly at a desired rate.

In an additional aspect, the method can further comprise returning the first cart to the resting position after debris is unloaded from the first cart onto the first conveyor assembly. In another aspect, the method can further comprise disengaging the first cart from the lifting apparatus and effecting engagement between at least one arm assembly of the lifting apparatus and a second cart of the at least one cart. In a further aspect, following engagement between the at least one arm assembly and the second cart, the method can further comprise selectively rotating the at least one arm assembly of the lifting apparatus relative to the rotational axis to move the second cart from the resting position to the unloading position.

In exemplary aspects, when the at least one arm assembly comprises at least one engagement element as disclosed herein, it is contemplated that the at least one engagement element can engage the base of the first cart to effect engagement between the at least one arm assembly and the first cart. In these aspects, it is further contemplated that the at least one engagement element can also effect engagement between additional carts as further disclosed herein.

In further exemplary aspects, when each cart comprises at least one receptacle as disclosed herein, it is contemplated that each engagement element of the lifting apparatus can be received within a corresponding receptacle of a respective cart (e.g., the first cart) to effect engagement between the at least one arm assembly and the cart. In still further exemplary aspects, when the at least one receptacle of each cart comprises first and second sets of receptacles as disclosed herein, it is contemplated that the at least one engagement element can engage either the first set of receptacles or the second set of receptacles depending upon the orientation of the cart in the resting position.

In additional aspects, the method can further comprise sorting the debris on the second conveyor assembly. In these aspects, it is contemplated that any conventional sorting technique can be employed. Optionally, it is contemplated that the sorting can be performed manually. However, in exemplary aspects, it is contemplated that at least a portion of the sorting can be performed in an automated manner using conventional sorting equipment.

Figure 9:
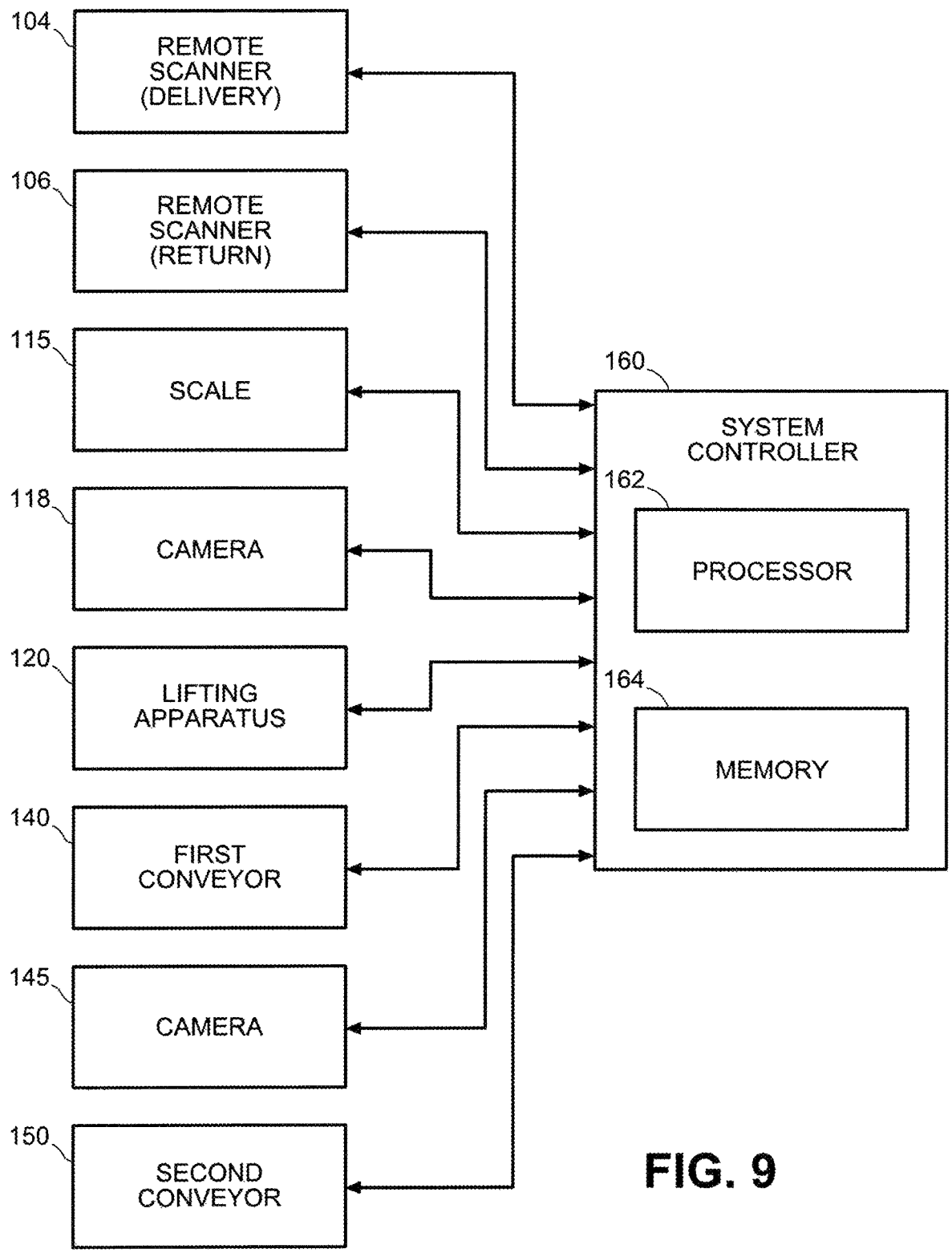
FIG. 9 is a schematic diagram depicting an exemplary system for processing debris as disclosed herein.

In further aspects, when each cart is assigned a unique identifier and provided with indicia of the unique identifier, the method can further comprise detecting the indicia of the unique identifier of the first cart prior to moving the first cart from the resting position to the unloading position. In these aspects, the indicia of the unique identifier can be detected using conventional barcode-scanning equipment (e.g, scanning guns), RFID detection equipment, or optical recognition equipment and/or software. However, it is contemplated that any known scanning and/or detecting device or equipment can be used to detect a complementary form of indicia. In addition to detecting the indicia of the unique identifier of a cart before the cart is moved to the unloading position, it is contemplated that the indicia can be detected at other times and locations throughout the method. For example, as shown in FIG. 9, it is contemplated that a remote scanner 104 can be used to detect (scan) the indicia at the time of delivery of a cart to a given jobsite. It is further contemplated that a remote scanner 106 can be used to detect (scan) the indicia again at the time the cart is returned from a jobsite for subsequent delivery to a debris processing facility.

In still further aspects, the method can comprise measuring a weight of the first cart. In these aspects, it is contemplated that the weight of the first cart (and subsequent carts) can be measured before debris is unloaded from the cart, thereby providing for determination of the weight of debris loaded into the cart at the jobsite. In exemplary aspects, the first cart and subsequent carts can be provided to the lifting apparatus on a platform 110 that comprises a scale 115 positioned proximate the lifting apparatus.

In still further aspects, the method can comprise producing an image of the cart prior to positioning of the cart in the unloading position. In these aspects, the image can be produced using a first camera 118 as is known in the art.

In still further aspects, the method can comprise producing an image of debris unloaded from the cart onto the first conveyor assembly. In these aspects, it is contemplated that the image can be produced using the first camera 118 or a second camera 145 as is known in the art.

In exemplary aspects, the method can comprise positioning a plurality of bins 170 along the downstream conveyor assembly 150 (or the second conveyor assembly) such that the top surface 152 of the downstream conveyor assembly is in communication with at least one wall of each bin of the plurality of bins 170 to facilitate delivery of debris into the interior space 186 of each bin. In further aspects, the method can comprise transporting the debris along the top surface 152 of the downstream conveyor assembly 150 relative to a conveyor axis 154. It is contemplated that the debris can be selectively sorted on the top surface 152 of the downstream conveyor assembly 150. In additional aspects, the debris can be selectively moved into at least one bin of the plurality of bins 170. In these aspects, it is contemplated that the debris can be manually sorted by a worker or plurality of workers positioned proximate the downstream conveyor assembly 150 and the plurality of bins 170. As the debris is advanced along the conveyor assembly 150, the worker(s) can manually direct debris into respective bins to achieve a desired distribution of debris within the bins. Alternatively, it is contemplated that the debris can be sorted in an automated fashion using sorting equipment (e.g., diverters and guide arms) that is selectively deployed to direct debris into a desired bin. In such an automated arrangement, it is contemplated that the system controller 160 can be communicatively coupled to the diverters and guide arms, and the system controller 160 can be configured to selectively adjust the arrangement of the sorting equipment to define a desired pathway for the flow of debris into a particular bin. Optionally, in these automated configurations, the system controller 160 can be configured to adjust the flow of debris based upon continuous monitoring of the amount of debris within each bin of the plurality of bins. In still further aspects, the method can comprise producing an image of debris moved into the at least one bin 170. In these aspects, it is contemplated that the image can be produced using a third camera 198 or a plurality of cameras 198. It is contemplated that each camera 198 can be securely positioned in a location that permits imaging of at least one bin of the plurality of bins. Optionally, a single camera 198 that is capable of imaging each bin can be provided. In these aspects, it is contemplated that the camera 198 can be positioned at a vertical location above the plurality of bins (e.g., mounted to a wall or ceiling of a facility where the debris is processed as disclosed herein). Alternatively, a plurality of cameras 198 can be provided, with each camera being positioned to image one or more designated bins of the plurality of bins. In these aspects, the plurality of cameras can be positioned at a vertical location above the plurality of bins (e.g., mounted to a wall or ceiling of a facility where the debris is processed as disclosed herein). Alternatively, it is contemplated that each camera 198 of the plurality of cameras can be coupled or mounted to or within a respective bin in a position permitting imaging of the contents of the bin.

In further exemplary aspects, the method can comprising activating the actuator 175 to effect movement of the base 174 of at least one bin from the closed position toward the open position. When the base 174 is moved to the open position, the debris can be unloaded from the at least one bin into at least one container 240 that is positioned below the at least one bin. It is contemplated that the weight of the at least one bin can be measured prior to activation of the actuator 175. When the weight of the at least one bin is measured, a signal indicative of the measured weight can be transmitted to a system controller 160 as disclosed herein. It is further contemplated that the speed of the downstream conveyor assembly 150 can be selectively adjusted prior to unloading the debris from the at least one bin. Once the debris is unloaded from the at least one bin, the base 174 of each bin of the at least one bin can be returned to the closed position. In this aspect, the actuator 175 can be activated to effect movement of the base 174 from the open position toward the closed position.

As further described herein, it is contemplated that the downstream conveyor assembly 150 can receive debris after the debris has been unloaded from the at least one cart 10. In further aspects, with the first cart in the unloading position, the upstream conveyor assembly can receive debris exiting the first cart, and the downstream conveyor assembly 150 can receive the debris from the upstream conveyor assembly 140.

In some exemplary aspects, it is contemplated that the disclosed systems can include a plurality of carts delivered to a jobsite for processing or, more particularly, a plurality of carts associated with a specific invoice or specific client or client account (hereinafter, "a plurality of associated carts"). In use, the debris from each cart of the plurality of carts (e.g., each cart of a plurality of associated carts) can be unloaded as described herein. When debris from the first cart of the plurality of carts is unloaded, the debris can be transported toward the plurality of bins. As further described herein, the downstream conveyor assembly can receive the debris from the first cart of the plurality of carts. It is contemplated that the upstream conveyor can receive the debris exiting the first cart of the plurality of carts. It is further contemplated that the upstream conveyor can transport the debris toward the downstream conveyor. Once the downstream conveyor receives debris from the upstream conveyor, the downstream conveyor can transport the debris toward the plurality of bins. In this aspect, the debris from the first cart of the plurality of carts can be selectively sorted or distributed into the plurality of bins as desired, using either manual or automated means. In these aspects, the process is repeated until the debris from the final cart of the plurality of associated carts has been distributed into the plurality of bins. If desired, the weight of each bin can then be measured, and a total weight of debris within the plurality of bins can be determined. As can be appreciated, this total weight can be indicative of the total combined weight of the plurality of associated carts.

Optionally, in exemplary aspects, and with reference to FIG. 9, it is contemplated that the system 100 can comprise a system controller 160 having at least one processor 162 and at least one memory 164 in communication with the at least one processor. Exemplary system controllers include computing devices as are known in the art, such as computers, workstations, smartphones, handheld computing devices, programmable logic controllers, and the like. Although shown in FIG. 9 as comprising a single processor 162 and a single memory 164, it is contemplated that the various components of the disclosed system 100 can comprise their own respective processors and/or memories that communicate with the processors and memories of other system components to function as a system controller. In further exemplary aspects, and as shown in FIG. 9, it is contemplated that the system controller 160 can be communicatively coupled (optionally, wirelessly, such as over an Internet or cellular communication network) to various components of the system 100 to receive information and/or control the performance of the system. For example, it is contemplated that the system controller 160 can be communicatively coupled to the remote scanners 104, 106 to receive information regarding a cart (such as location) as the cart is delivered to a jobsite or returned from the jobsite. It is further contemplated that the system controller 160 can be communicatively coupled to the scale 115 to receive information from the scale regarding the weight of a cart. In exemplary aspects, the disclosed methods can comprise transmitting information regarding the weight of the first cart to a system controller as disclosed herein. In these aspects, the method can further comprise using the system controller to associate the measured weight of the first cart with the unique identifier assigned to the cart. It is further contemplated that the system controller 160 can be communicatively coupled to camera 118 and/or camera 145 to receive images obtained by the cameras and/or to control activation of the cameras during the processing of debris as disclosed herein. In exemplary aspects, the disclosed methods can comprise producing an image of the cart and/or an image of the debris provided from the first cart to the first conveyor assembly. In these aspects, the method can further comprise transmitting the image of the cart and/or the image of the debris to the system controller. The method can still further comprise using the system controller to associate the image of the cart and/or the image of the debris with the unique identifier assigned to the cart. It is further contemplated that the system controller 160 can be communicatively coupled to the actuator of the lifting apparatus 120 as disclosed herein. Optionally, the system controller 160 can selectively control the rotation of the lifting apparatus 120 to thereby control the movement of each cart about and between the resting position and the unloading position. Similarly, it is further contemplated that the system controller 160 can be communicatively coupled to the first conveyor assembly 140 and/or the second conveyor assembly 150. Optionally, the system controller 160 can selectively control the speed of one or both of the first and second conveyor assemblies 140, 150. It is contemplated that the system controller 160 can be communicatively coupled to the actuator of at least one bin of the plurality of bins, as further disclosed herein. Optionally, the system controller can be communicatively coupled to the plurality of sensors positioned proximate each bin to receive an output indicative of a desired about of debris within the respective bin. In exemplary aspects, the disclosed methods can comprise transmitting information regarding the weight of at least one bin to a system controller as disclosed herein. It is further contemplated that the system controller can be communicatively coupled to the indicator to receive an alert related to the amount (e.g., height) of debris within a bin. In use, it is contemplated that the memory 164 of the system controller 160 can store data and other information obtained during the processing of debris as disclosed herein. Such data can be retrieved as desired to produce invoices, reports, and other deliverables related to the debris collected in a cart or group of carts as disclosed herein.

Thus, in use, it is contemplated that the disclosed systems and methods can provide various advantages in comparison to conventional debris processing techniques. For example, it is contemplated that the disclosed systems and methods can be used to deliver carts to a jobsite via a straight truck with a conventional lift gate, rather than by the roll-off mechanisms typically required for placement of dumpsters. It is further contemplated that the disclosed systems and methods can eliminate the need for a large designed area for loading and placement of a dumpster. Instead, carts can be delivered at a variety of locations throughout a jobsite, and following delivery, the carts can be selectively dispersed (rolled) throughout the jobsite as required, with minimal effort. In contrast to conventional practices, the disclosed systems and methods allow for placement of debris directly into a cart, regardless of the location of the debris within the jobsite, thereby eliminating the need for piling and "double handling" of debris. After debris is collected within a cart, it is contemplated that the cart can be rolled directly to a truck for transport—there is no need for transferring the material from the cart to a dumpster. Due to the flexibility provided by the carts, it is contemplated that the cart retrieval point (where carts are picked up by a truck) can be different than the cart delivery point (where carts were first delivered to the jobsite). It is still further contemplated that individual carts can be designed for specific materials to thereby produce greater recycling yields; in contrast, current techniques typically require that all materials be placed into a common dumpster. Given the ease with which the disclosed carts can be selectively positioned, it is contemplated that the disclosed systems and methods can provide for greater control over the access to carts, thereby enhancing the security over the content of the carts while limiting or preventing the placement of non-jobsite waste into the carts. It is still further contemplated that the tracking and monitoring systems and disclosed herein can be used to track the specific sources of discarded debris, with carts having been distributed among specialized jobsites.

Exemplary Processes

The following descriptions relate to exemplary, non-limiting processes consistent with the disclosed systems and methods.

Example One

Initially, an order for at least one cart can be placed for a specific jobsite. A dispatch ticket can be created with a unique ticket number. Each cart is provided with indicia associating the cart with the ticket number. The desired number of carts can be scanned and assigned to the jobsite location. The carts can then be delivered to the jobsite. Following delivery, the carts can be rolled to desired work areas at the jobsite. Debris materials can be placed into the carts. As described herein, carts can optionally be designated for specific materials, source separating, for higher recycling yield. Full carts can be rolled to a loading dock or other area for pickup, which can occur at a location different than the drop-off location. At the time of pick-up, the indicia (barcode/RFID) associated with each cart can be scanned for jobsite identification and inventory tracking. Filled carts can then be brought to the recycling facility. The carts can be rolled from the truck onto a platform and placed in queue for processing. Each cart can be moved onto a scale, which is positioned proximate a lifting apparatus. The lifting apparatus can comprise a hydraulic actuator arm with a fork mechanism. Immediately before the cart lift mechanism begins to operate, the barcode/RFID of the cart is scanned, the cart is weighed, and the cart is photographed. The forks lift the cart in an arcuate path corresponding to an arc length of about 160 degrees. The debris/materials fall from the cart (via gravity) onto a feeder conveyor. The feeder conveyor can meter the materials onto the sorting conveyor line. The cart can be brought back down to the platform and removed manually from the forks. The process can be repeated for each cart. Empty carts can be available for reuse. On the feeder conveyor prior to sorting, the debris/materials can be photographed to document the content of each cart. The recorded data can be joined to the barcode/RFID and jobsite location information. Mechanical sorting and/or hand sorting of the debris can be performed. Materials can be selected based on current market conditions of recyclability and value. The recorded data can then be used for invoicing and recycling report generation.

Example Two

Initially, a driver can scan each cart when loaded into a truck at a customer's location. The truck can be weighed upon arrival at a debris processing facility. The net weight can be automatically calculated from the vehicle and cart tare weights. The net weight can be used for billing purposes. The truck can then be unloaded at a staging dock. As described herein, the carts can be kept in groups by ticket or truck.

To initiate the process, a system controller can perform a system check on startup. The operator can then select the first cart from a group (or ticket) to be weighed, open the lift door, and push the cart into the lift. Scanners can be located on both sides of the lift doorway to scan the cart while in motion. Photo-eye sensors can be used to activate the scanners. Once the first cart is positioned inside the lift, the operator can close the door, and the lift door can automatically lock. Once the door is locked, a light on the lift door can become activated, indicating that the door has been successfully locked. The scale can then be triggered to retrieve the gross weight of the cart. If there is a gross weight and the scan did not occur (i.e., there is no barcode read), then a form can appear on a display device to allow the operator to enter the cart number manually. If all carts from the group are downloaded to the system controller and displayed on the touch screen, then a successful scan has been achieved. Once the door is locked, the lift can be activated. The cart can then be marked completed on the touch screen of the display device.

The content of the cart (i.e., the debris) can be unloaded onto the upper conveyor assembly. Once the content is unloaded, at least one image can be taken of the content. Proximity sensor(s) can be used to activate the cameras. After images have been taken, the content can then be sorted into bins (e.g., twelve bins). The process can be repeated until all carts from the group have been weighed. The last cart of the group can be detected by the controller, which can cause the controller to begin monitoring the movement of the belt. Enough distance can be provided for the debris from the final cart to reach the end of the downstream conveyor assembly. Once the content of all carts have been distributed into the bins, the bin weights can be taken, and then the scales can be set to zero. The system controller can store the gross weight of the cart, the images, and the weights of the plurality of bins in a database (e.g., a SQL database), which can be designed by the customer. The lift door can remain locked until completion of the weighing of a group of associated carts to prohibit the next group from being processed. After the weighing of all associated carts is completed, the central controller can be configured to permit opening of the lift door.

Sort line operators can be positioned along the downstream conveyor assembly. When a sort line operator's assigned bin is full, the sort line operators can request that the bin be emptied by pushing a button. The button can comprise a light source which can be activated when the button is pushed. The system can include a second light in communication with the button and positioned underneath each bin. When the button is compressed (i.e., pressed), the second light becomes activated, alerting the ground crew to empty the bin. A forklift operator can have a mobile device with a custom software application. The custom software application can display the bins that need to be emptied. The forklift operator can move a container underneath the respective bin, and push a button on the mobile device to activate the actuator to effect movement of the base from the closed position toward the open position. When a bin is being emptied, operation of the lift and the upstream and downstream conveyor assemblies can be stopped until the base is returned to the closed position. If a sort line operator requests that a bin be emptied in the middle of a group, then the system controller can store the partial weight of the group. Before the base is returned to the closed position, the scale can be set to zero.

During the described process, it is possible to change commodities assigned to the bins in between groups and after the bins have been emptied.

If the cart is too heavy for the lift or damaged, the system controller can be programmed to have a "finish short" button. This can discard the cart gross weight and allow the group to be finished short. Alternatively, the maximum weight for the lift can be identified, the bins and commodities can be displayed, and the operator can select which bin will receive the net weight from the lift scale.

As disclosed herein, the system controller can be provided in communication with a user interface, which allows a system operator to control operation of the system through the system controller. In exemplary aspects, the system controller can receive a user-input initiating a "Re-Dump" procedure, which can be used if any material is remaining in the cart after the initial cycle of lifting the cart and emptied debris onto the upstream conveyor assembly. Optionally, when the "Re-Dump" procedure is commenced, the lift can shake the cart (e.g., by back-and-forth movement and/or vibrational force), either before or after the cart is inverted, to cause any remaining debris to become dislodged from the cart and fall onto the conveyor assembly. In exemplary aspects, it is contemplated that this shaking feature can be incorporated into all lifting and unloading sequences of carts using the lift apparatus such that the lift apparatus shakes each cart as part of the standard debris unloading process.

Exemplary Aspects

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system for processing debris, the system comprising: at least one cart having a base, a plurality of wheels extending downwardly from the base relative to a vertical axis, and a plurality of walls extending upwardly from the base, wherein the walls and the base of each cart cooperate to define a debris-receiving space; a lifting apparatus having at least one arm assembly configured to engage a portion of the base of a respective cart of the at least one cart when the cart is in a resting position, wherein, following engagement between the at least one arm assembly and the cart, the at least one arm assembly of the lifting apparatus is selectively rotatable relative to a rotational axis to move the cart about and between the resting position and an unloading position, and wherein the cart reaches the unloading position following rotational movement of the at least one arm assembly of the lifting apparatus along an arcuate path having an arc length ranging from about 130 degrees to about 170 degrees; and a first conveyor assembly configured to receive debris from the at least one cart when the at least one cart is in the unloading position.

Aspect 2: The system of aspect 1, wherein the lifting apparatus comprises an actuator coupled to the at least one arm assembly of the lifting apparatus, wherein the actuator is configured to effect selective rotational movement of the at least one arm assembly of the lifting apparatus.

Aspect 3: The system of aspect 2, wherein each arm assembly of the lifting apparatus comprises: an arm; and at least one engagement element coupled to the arm and configured to engage the base of the cart.

Aspect 4: The system of aspect 3, wherein each cart defines at least one receptacle extending downwardly from the base, wherein each receptacle of the cart is configured to receive a corresponding engagement element of the lifting apparatus.

Aspect 5: The system of aspect 4, wherein the plurality of walls of each cart comprise: opposed front and back walls; and opposed first and second side walls, wherein the first and second side walls extend between and are connected to the front and back walls, wherein the at least one receptacle of each cart comprises a first set of receptacles having at least one row of receptacles aligned relative to a longitudinal axis extending through the opposed first and second side walls of the cart.

Aspect 6: The system of aspect 5, wherein the at least one receptacle of each cart further comprises a second set of receptacles having at least one row of receptacles aligned relative to a transverse axis extending through the opposed walls of the cart.

Aspect 7: The system of aspect 6, wherein the at least one engagement element is configured to engage either the first set of receptacles or the second set of receptacles of each cart depending upon the orientation of the cart.

Aspect 8: The system of aspect 3, wherein the at least one engagement element of each arm assembly is pivotally coupled to the arm of the arm assembly.

Aspect 9: The system of aspect 1, further comprising a second conveyor assembly, wherein the first conveyor assembly is configured to deliver debris to the second conveyor assembly at a selectively adjustable rate.

Aspect 10: A method for processing debris, comprising: providing at least one cart to a jobsite, each cart having a base, a plurality of wheels extending downwardly from the base relative to a vertical axis, and a plurality of walls extending upwardly from the base, wherein the walls and the base of each cart cooperate to define a debris-receiving space; transporting the at least one cart from the jobsite to a debris processing facility, the debris processing facility comprising a lifting apparatus and a first conveyor assembly; effecting engagement between at least one arm assembly of a lifting apparatus and a first cart of the at least one cart; and following engagement between the at least one arm assembly and the first cart, selectively rotating the at least one arm assembly of the lifting apparatus relative to a rotational axis to move the first cart from a resting position to an unloading position, wherein the first cart reaches the unloading position following rotational movement of the at least one arm assembly of the lifting apparatus along an arcuate path having an arc length ranging from about 130 degrees to about 170 degrees, wherein, with the first cart in the unloading position, the first conveyor assembly receives debris exiting the first cart.

Aspect 11: The method of aspect 10, wherein an actuator is coupled to the at least one arm assembly of the lifting apparatus, and wherein the actuator effects selective rotational movement of the at least one arm assembly of the lifting apparatus.

Aspect 12: The method of aspect 11, further comprising returning the first cart to the resting position after debris is unloaded from the first cart onto the first conveyor assembly.

Aspect 13: The method of aspect 12, further comprising: disengaging the first cart from the lifting apparatus; effecting engagement between at least one arm assembly of the lifting apparatus and a second cart of the at least one cart; and following engagement between the at least one arm assembly and the second cart, selectively rotating the at least one arm assembly of the lifting apparatus relative to the rotational axis to move the second cart from the resting position to the unloading position.

Aspect 14: The method of aspect 10, wherein each arm assembly of the lifting apparatus comprises: an arm; and at least one engagement element coupled to the arm, wherein the at least one engagement element of the arm assembly engages the base of the first cart to effect engagement between the at least one arm assembly and the first cart.

Aspect 15: The method of aspect 14, wherein each cart defines at least one receptacle extending downwardly from the base, and wherein each engagement element of the lifting apparatus is received within a corresponding receptacle of the first cart to effect engagement between the at least one arm assembly and the first cart.

Aspect 16: The method of aspect 15, wherein the plurality of walls of each cart comprise: opposed front and back walls; and opposed first and second side walls, wherein the first and second side walls extend between and are connected to the front and back walls, wherein the at least one receptacle of each cart comprises: a first set of receptacles having at least one row of receptacles aligned relative to a longitudinal axis extending through the opposed first and second side walls of the cart; and a second set of receptacles having at least one row of receptacles aligned relative to a transverse axis extending through the opposed walls of the cart.

Aspect 17: The method of aspect 16, wherein the at least one engagement element engages the first set of receptacles of the first cart to effect engagement between the at least one arm assembly and the first cart.

Aspect 18: The method of aspect 16, wherein the at least one engagement element engages the second set of receptacles of the first cart to effect engagement between the at least one arm assembly and the first cart.

Aspect 19: The method of aspect 10, further comprising selectively adjusting a speed of the first conveyor assembly to deliver debris to a second conveyor assembly at a desired rate.

Aspect 20: The method of aspect 19, further comprising sorting the debris on the second conveyor assembly.

Aspect 21: The method of aspect 10, wherein each cart is assigned a unique identifier and provided with indicia of the unique identifier, wherein the method further comprises: detecting the indicia of the unique identifier of the first cart prior to moving the first cart from the resting position to the unloading position; measuring a weight of the first cart; transmitting information regarding the weight of the first cart to a system controller; using the system controller to associate the measured weight of the first cart with the unique identifier assigned to the first cart; producing an image of the debris provided from the first cart to the first conveyor assembly; transmitting the image of the debris to the system controller; and using the system controller to associate the image of the debris with the unique identifier assigned to the first cart.

Aspect 22: A debris cart comprising: a base; a plurality of wheels extending downwardly from the base relative to a vertical axis; and a plurality of walls extending upwardly from the base of the base assembly, wherein the plurality of walls cooperate with the base to define a debris-receiving space, the plurality of walls comprising: opposed front and back walls; and opposed first and second side walls, wherein the first and second side walls extend between and are connected to the front and back walls, wherein each wall of the plurality of walls has a rounded upper edge, wherein the front and back walls have respective outer surfaces, and wherein, moving from the respective rounded upper edges of the front and back walls to the base, the outer surfaces of the front and back walls are axially tapered at a first taper angle relative to the vertical axis, and wherein the first and second side walls have respective outer surfaces, and wherein, moving from the rounded upper edge of each side wall to the base, the outer surfaces of the first and second side walls are axially tapered at a second taper angle relative to the vertical axis; and a plurality of receptacles extending downwardly from the base, wherein the plurality of receptacles comprise: a first set of receptacles having at least one row of receptacles aligned relative to a longitudinal axis extending through the opposed first and second side walls of the cart; and a second set of receptacles having at least one row of receptacles aligned relative to a transverse axis extending through the opposed walls of the cart.

Aspect 23: A system for processing debris, the system comprising: a plurality of bins capable of receiving debris, each bin comprising: a base assembly having a base that is configured for selective movement about and between an open position and a closed position, and an actuator operatively coupled to the base and operable to effect selective movement of the base about and between the open position and the closed position; and a plurality of walls coupled to and extending upwardly from the base, wherein the plurality of walls and the base cooperate to define an interior space; a downstream conveyor assembly configured to deliver debris toward the plurality of bins, wherein the downstream conveyor assembly has a top surface that is positioned in communication with at least one wall of each bin of the plurality of bins to facilitate delivery of debris into the interior space of each bin, wherein as the base of each bin moves from the closed position toward the open position, the base is configured to dispense debris from the interior space of the bin through the base.

Aspect 24: The system of aspect 23, further comprising a support assembly having a rail extending horizontally relative to the downstream conveyor assembly, and a plurality of support posts coupled to and extending downwardly from the rail, wherein the plurality of bins are securely coupled to the rail.

Aspect 25: The system of aspect 23, further comprising a system controller having at least one processor and at least one memory in communication with the at least one processor, wherein the system controller is communicatively coupled to the actuator of each bin of the plurality of bins.

Aspect 26: The system of aspect 25, wherein each bin of the plurality of bins comprises a load cell configured to produce an output corresponding to a weight of debris within the respective bin.

Aspect 27: The system of aspect 26, wherein the system controller is configured to receive and store the output from the load cell of each respective bin of the plurality of bins.

Aspect 28: The system of aspect 26, wherein the system controller comprises at least one programmable logic controller communicatively coupled to the actuator of each bin of the plurality of bins.

Aspect 29: The system of aspect 23, further comprising a plurality of sensors, wherein each sensor of the plurality of sensors is positioned proximate a respective bin of the plurality of bins, wherein each sensor is configured to produce an output indicative of a desired amount of debris within the respective bin.

Aspect 30: The system of aspect 29, further comprising an indicator in communication with the sensor and configured to receive the output from the sensor, wherein, upon receipt of the output, the indicator produces an alert corresponding to the output.

Aspect 31: The system of aspect 30, wherein the alert comprises an audible alert, a visual alert, a signal transmitted to a remote device, or a combination thereof.

Aspect 32: The system of aspect 31, further comprising a remote device that receives the alert, wherein the remote device is a computer, a mobile phone, a remote control, a tablet, or a handheld device.

Aspect 33: The system of aspect 32, wherein, following activation of the alert, the remote device is configured to produce an activation signal, wherein upon receipt of the activation signal by the actuator, the actuator effects movement of the base from the closed position toward the open position to permit unloading of the debris from the interior space of the respective bin of the plurality of bins.

Aspect 34: The system of aspect 33, further comprising at least one container that is positioned below a bin of the plurality of bins and configured to receive debris that is unloaded from the bin.

Aspect 35: The system of aspect 23, further comprising: at least one cart having a base, a plurality of wheels extending downwardly from the base relative to a vertical axis, and a plurality of walls extending upwardly from the base, wherein the walls and the base of each cart cooperate to define a debris-receiving space; a lifting apparatus having at least one arm assembly configured to engage a portion of the base of a respective cart of the at least one cart when the cart is in a resting position, wherein, following engagement between the at least one arm assembly and the cart, the at least one arm assembly of the lifting apparatus is selectively rotatable relative to a rotational axis to move the cart about and between the resting position and an unloading position, and wherein the cart reaches the unloading position following rotational movement of the at least one arm assembly of the lifting apparatus along an arcuate path having an arc length ranging from about 130 degrees to about 170 degrees, wherein the downstream conveyor assembly is configured to receive debris after the debris has been unloaded from the at least one cart.

Aspect 36: The system of aspect 35, further comprising an upstream conveyor assembly configured to receive debris from the at least one cart when the at least one cart is in the unloading position, wherein the downstream conveyor is configured to receive the debris from the upstream conveyor.

Aspect 37: The system of aspect 23, wherein the downstream conveyor assembly is configured to deliver debris toward the plurality of bins at a selectively adjustable rate.

Aspect 38: A method of processing debris, comprising: positioning a plurality of bins along a downstream conveyor assembly having a top surface, each bin comprising a base assembly having a base that is configured for selective movement about and between an open position and a closed position, and an actuator operatively coupled to the base and operable to effect selective movement of the base about and between the open position and the closed position, and a plurality of walls coupled to and extending upwardly from the base, wherein the plurality of walls and the base cooperate to define an interior space, and wherein the top surface of the downstream conveyor is positioned in communication with at least one wall of each bin of the plurality of bins to facilitate delivery of debris into the interior space of each bin; transporting debris along the top surface of the downstream conveyor assembly relative to a conveyor axis; selectively moving the debris into at least one bin of the plurality of bins; activating the actuator to effect movement of the base of the at least one bin from the closed position toward the open position; and unloading debris from the at least one bin into at least one container positioned below the at least one bin and configured to receive the debris that is unloaded from the at least one bin.

Aspect 39: The method of aspect 38, further comprising measuring the weight of the at least one bin prior to unloading the debris.

Aspect 40: The method of aspect 39, further comprising transmitting the weight of the at least one bin to a system controller.

Aspect 41: The method of aspect 38, further comprising returning the base to the closed position following the step of unloading the debris from the at least one bin.

Aspect 42: The method of aspect 38, further comprising selectively adjusting a speed of the downstream conveyor assembly prior to unloading the debris from the at least one bin.

Aspect 43: The method of aspect 38, further comprising selectively sorting the debris on the top surface of the downstream conveyor assembly.

Aspect 44: The method of aspect 38, further comprising: providing at least one cart to a jobsite, each cart having a base, a plurality of wheels extending downwardly from the base relative to a vertical axis, and a plurality of walls extending upwardly from the base, wherein the walls and the base of each cart cooperate to define a debris-receiving space; transporting the at least one cart from the jobsite to a debris processing facility, the debris processing facility comprising a lifting apparatus and an upstream conveyor assembly; effecting engagement between at least one arm assembly of a lifting apparatus and a first cart of the at least one cart; and following engagement between the at least one arm assembly and the first cart, selectively rotating the at least one arm assembly of the lifting apparatus relative to a rotational axis to move the first cart from a resting position to an unloading position, wherein the first cart reaches the unloading position following rotational movement of the at least one arm assembly of the lifting apparatus along an arcuate path having an arc length ranging from about 130 degrees to about 170 degrees, wherein the downstream conveyor assembly receives debris after the debris has been unloaded from the at least one cart.

Aspect 45: The method of aspect 44, wherein, with the first cart in the unloading position, the upstream conveyor assembly receives debris exiting the first cart, and wherein the downstream conveyor assembly receives the debris from the upstream conveyor assembly.

Aspect 46: The method of aspect 44, wherein each cart is assigned a unique identifier and provided with indicia of the unique identifier, wherein the method further comprises: detecting the indicia of the unique identifier of the first cart prior to moving the first cart from the resting position to the unloading position; measuring a weight of the first cart; transmitting information regarding the weight of the first cart to a system controller; using the system controller to associate the measured weight of the first cart with the unique identifier assigned to the first cart; producing an image of the debris provided from the first cart to the upstream conveyor assembly; transmitting the image of the debris to the system controller; and using the system controller to associate the image of the debris with the unique identifier assigned to the first cart.

Aspect 47: The method of aspect of 46, wherein the at least one cart comprises a plurality of carts, and wherein the method further comprises unloading debris from each cart of the plurality of carts, transporting the debris from each cart of the plurality of carts toward the plurality of bins, selectively distributing the debris from each cart of the plurality of carts into the plurality of bins, measuring the weight of each bin of the plurality of bins, and determining a total weight of debris within the plurality of bins.

Aspect 48: A debris bin, comprising: a base assembly comprising: a base that is configured for selective movement about and between an open position and a closed position, and an actuator operatively coupled to the base and operable to effect selective movement of the base about and between the open position and the closed position; and a plurality of walls coupled to and extending upwardly from the base, wherein the plurality of walls and the base cooperate to define an interior space, wherein as the base of each bin moves from the closed position toward the open position, the base is configured to dispense debris from the interior space of the bin through the base.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be comprised within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A system for processing debris, the system comprising:
    a support assembly;
    a plurality of bins capable of receiving debris, each bin comprising:
        a base assembly having a base that is configured for selective movement about and between an open position and a closed position, and an actuator operatively coupled to the base and operable to effect selective movement of the base about and between the open position and the closed position; and
        a plurality of walls coupled to and extending upwardly from the base, wherein the plurality of walls and the base cooperate to define an interior space,
        wherein each bin of the plurality of bins is securely coupled to the support assembly in a respective fixed position;
    a downstream conveyor assembly configured to deliver debris along a conveyor axis, wherein the downstream conveyor assembly has a belt having a top surface, wherein each bin of the plurality of bins is positioned to permit transfer of debris from the top surface of the belt of the downstream conveyor assembly into the interior space of each bin in a direction transverse to the conveyor axis, wherein movement of the belt of the downstream conveyor assembly causes movement of the top surface of the belt relative to the respective fixed positions of each bin of the plurality of bins, wherein as the base of each bin moves from the closed position toward the open position, the base is configured to unload debris from the interior space of the bin through the base.

2. The system of claim 1, wherein the support assembly has:
a rail extending horizontally relative to the downstream conveyor assembly, and
a plurality of support posts coupled to and extending downwardly from the rail, wherein the plurality of bins are securely coupled to the rail.

3. The system of claim 1, further comprising a system controller having at least one processor and at least one memory in communication with the at least one processor, wherein the system controller is communicatively coupled to the actuator of each bin of the plurality of bins.

4. The system of claim 3, wherein each bin of the plurality of bins comprises a load cell configured to produce an output corresponding to a weight of debris within the respective bin.

5. The system of claim 4, wherein the system controller is configured to receive and store the output from the load cell of each respective bin of the plurality of bins.

6. The system of claim 4, wherein the system controller comprises at least one programmable logic controller communicatively coupled to the actuator of each bin of the plurality of bins.

7. The system of claim 1, further comprising a plurality of sensors, wherein each sensor of the plurality of sensors is positioned proximate a respective bin of the plurality of bins, wherein each sensor is configured to produce an output indicative of a desired amount of debris within the respective bin.

8. The system of claim 7, further comprising an indicator in communication with the sensor and configured to receive the output from the sensor, wherein, upon receipt of the output, the indicator produces an alert corresponding to the output.

9. The system of claim 8, wherein the alert comprises an audible alert, a visual alert, a signal transmitted to a remote device, or a combination thereof.

10. The system of claim 9, further comprising a remote device that receives the alert, wherein the remote device is a computer, a mobile phone, a remote control, a tablet, or a handheld device.

11. The system of claim 10, wherein, following activation of the alert, the remote device is configured to produce an activation signal, wherein upon receipt of the activation signal by the actuator, the actuator effects movement of the base from the closed position toward the open position to permit unloading of the debris from the interior space of the respective bin of the plurality of bins.

12. The system of claim 11, further comprising at least one container that is positioned below a bin of the plurality of bins and configured to receive debris that is unloaded from the bin.

13. The system of claim 1, further comprising:
at least one cart having a base, a plurality of wheels extending downwardly from the base relative to a vertical axis, and a plurality of walls extending upwardly from the base, wherein the walls and the base of each cart cooperate to define a debris-receiving space;
a lifting apparatus having at least one arm assembly configured to engage a portion of the base of a respective cart of the at least one cart when the cart is in a resting position, wherein, following engagement between the at least one arm assembly and the cart, the at least one arm assembly of the lifting apparatus is selectively rotatable relative to a rotational axis to move the cart about and between the resting position and an unloading position, and wherein the cart reaches the unloading position following rotational movement of the at least one arm assembly of the lifting apparatus along an arcuate path having an arc length ranging from about 130 degrees to about 170 degrees,
wherein the downstream conveyor assembly is configured to receive debris after the debris has been unloaded from the at least one cart.

14. The system of claim 13, further comprising an upstream conveyor assembly configured to receive debris from the at least one cart when the at least one cart is in the unloading position, wherein the downstream conveyor is configured to receive the debris from the upstream conveyor.

15. The system of claim 1, wherein the downstream conveyor assembly is configured to deliver debris along the conveyor axis at a selectively adjustable rate.

16. The system of claim 1, wherein the bins comprise a front wall, wherein each bin of the plurality of bins is positioned with the front wall of the bin facing the downstream conveyor assembly, wherein each bin of the plurality of bins is positioned with respect to the top surface of the belt so that the front wall does not obstruct transfer of debris from the top surface of the belt of the downstream conveyor assembly into the interior space of each bin in a direction transverse to the conveyor axis.

17. A method of processing debris, comprising:
securely coupling a plurality of bins to a support assembly in respective fixed positions, each bin comprising:
a base assembly having:
a base that is configured for selective movement about and between an open position and a closed position, and
an actuator operatively coupled to the base and operable to effect selective movement of the base about and between the open position and the closed position, and
a plurality of walls coupled to and extending upwardly from the base, wherein the plurality of walls and the base cooperate to define an interior space;
transporting debris along a top surface of a downstream conveyor assembly relative to a conveyor axis so that the debris moves relative to the respective fixed positions of the plurality of bins, the downstream conveyor assembly having a belt defining the top surface, wherein each bin of the plurality of bins is positioned to permit transfer of debris from the top surface of the belt of the downstream conveyor assembly into the interior space of each bin;
selectively moving the debris in a direction transverse to the conveyor axis to transfer debris into the interior space of at least one bin of the plurality of bins;
activating the actuator to effect movement of the base of the at least one bin from the closed position toward the open position; and unloading debris from the at least one bin into at least one container positioned below the at least one bin and configured to receive the debris that is unloaded from the at least one bin.

18. The method of claim 17, further comprising measuring the weight of the at least one bin prior to unloading the debris.

19. The method of claim 18, further comprising transmitting the weight of the at least one bin to a system controller.

20. The method of claim 17, further comprising returning the base to the closed position following the step of unloading the debris from the at least one bin.

21. The method of claim 17, further comprising selectively adjusting a speed of the downstream conveyor assembly prior to unloading the debris from the at least one bin.

22. The method of claim 17, further comprising selectively sorting the debris on the top surface of the downstream conveyor assembly.

23. The method of claim 17, further comprising:
providing at least one cart to a jobsite, each cart having a base, a plurality of wheels extending downwardly from the base relative to a vertical axis, and a plurality of walls extending upwardly from the base, wherein the walls and the base of each cart cooperate to define a debris-receiving space;
transporting the at least one cart from the jobsite to a debris processing facility, the debris processing facility comprising a lifting apparatus and an upstream conveyor assembly;
effecting engagement between at least one arm assembly of a lifting apparatus and a first cart of the at least one cart; and
following engagement between the at least one arm assembly and the first cart, selectively rotating the at least one arm assembly of the lifting apparatus relative to a rotational axis to move the first cart from a resting position to an unloading position, wherein the first cart reaches the unloading position following rotational movement of the at least one arm assembly of the lifting apparatus along an arcuate path having an arc length ranging from about 130 degrees to about 170 degrees,
wherein the downstream conveyor assembly receives debris after the debris has been unloaded from the at least one cart.

24. The method of claim 23, wherein, with the first cart in the unloading position, the upstream conveyor assembly receives debris exiting the first cart, and wherein the downstream conveyor assembly receives the debris from the upstream conveyor assembly.

25. The method of claim 23, wherein each cart is assigned a unique identifier and provided with indicia of the unique identifier, wherein the method further comprises:
detecting the indicia of the unique identifier of the first cart prior to moving the first cart from the resting position to the unloading position;
measuring a weight of the first cart;
transmitting information regarding the weight of the first cart to a system controller;
using the system controller to associate the measured weight of the first cart with the unique identifier assigned to the first cart;
producing an image of the debris provided from the first cart to the upstream conveyor assembly;
transmitting the image of the debris to the system controller; and
using the system controller to associate the image of the debris with the unique identifier assigned to the first cart.

26. The method of claim of 25, wherein the at least one cart comprises a plurality of carts, and wherein the method further comprises:
unloading debris from each cart of the plurality of carts;
transporting the debris from each cart of the plurality of carts along the conveyor axis of the downstream conveyor assembly;
selectively distributing the debris from each cart of the plurality of carts into the plurality of bins;
measuring the weight of each bin of the plurality of bins; and
determining a total weight of debris within the plurality of bins.

* * * * *